(12) United States Patent
Foster et al.

(10) Patent No.: US 8,115,047 B2
(45) Date of Patent: Feb. 14, 2012

(54) AQUEOUS PHASE OXIDATION PROCESS

(75) Inventors: George G. Foster, Salt Lake City, UT (US); Frederick P. Kesler, Salt Lake City, UT (US); Malcolm Draper, New York, NY (US)

(73) Assignee: Earth Renewal Group, LLC, Salt Lake City, UT (US)

( * ) Notice: Subject to any disclaimer, the term of this patent is extended or adjusted under 35 U.S.C. 154(b) by 6 days.

(21) Appl. No.: 12/416,419

(22) Filed: Apr. 1, 2009

(65) Prior Publication Data

US 2010/0254881 A1  Oct. 7, 2010

(51) Int. Cl.
*A62D 3/00* (2007.01)
(52) U.S. Cl. ......................... 588/405; 210/908
(58) Field of Classification Search .................. 588/400, 588/405; 210/758, 761, 908
See application file for complete search history.

(56) References Cited

U.S. PATENT DOCUMENTS

| | | |
|---|---|---|
| 3,637,371 A | 1/1972 | Mackiw et al. |
| 3,649,665 A | 3/1972 | Chafetz et al. |
| 3,793,429 A | 2/1974 | Queneau et al. |
| 3,939,280 A | 2/1976 | Karnemaat |
| 3,953,577 A | 4/1976 | Ooka et al. |
| 3,960,718 A | 6/1976 | Lebo |
| 4,045,279 A | 8/1977 | Nagano et al. |
| 4,076,579 A | 2/1978 | Brink |
| 4,081,366 A | 3/1978 | O'Donnell |
| 4,084,961 A | 4/1978 | Caldon |
| 4,132,636 A | 1/1979 | Iwase et al. |
| 4,141,829 A | 2/1979 | Thiel et al. |
| 4,193,970 A | 3/1980 | Sefton et al. |
| 4,235,858 A | 11/1980 | Blakey et al. |
| 4,239,613 A * | 12/1980 | Schulz ............................ 44/627 |
| 4,272,383 A | 6/1981 | McGrew |
| 4,606,763 A | 8/1986 | Weir |
| 4,647,307 A | 3/1987 | Raudsepp et al. |
| 4,692,252 A | 9/1987 | Atwood et al. |
| 4,744,908 A | 5/1988 | Peterscheck et al. |
| 4,793,919 A | 12/1988 | McCorquodale |
| 4,803,054 A | 2/1989 | Sillerud et al. |
| 4,849,025 A | 7/1989 | Bain et al. |
| 4,878,945 A | 11/1989 | Raudsepp et al. |
| 4,891,139 A | 1/1990 | Zeigler et al. |
| 4,897,156 A | 1/1990 | Samuelson |
| 5,057,220 A | 10/1991 | Harada et al. |
| 5,057,231 A | 10/1991 | Mueller et al. |
| 5,106,513 A | 4/1992 | Hong |
| 5,118,337 A | 6/1992 | Bleeker |
| 5,125,951 A | 6/1992 | Lahoda et al. |
| 5,125,977 A | 6/1992 | Grohmann et al. |
| 5,183,577 A | 2/1993 | Lehmann |
| 5,192,453 A | 3/1993 | Keckler et al. |
| 5,232,604 A | 8/1993 | Swallow et al. |
| 5,236,492 A | 8/1993 | Shaw et al. |
| 5,240,619 A | 8/1993 | Copa et al. |
| 5,250,193 A | 10/1993 | Sawicki et al. |
| 5,252,224 A | 10/1993 | Modell et al. |
| 5,262,060 A | 11/1993 | Lehmann et al. |
| 5,302,298 A | 4/1994 | Leitzke |
| 5,316,567 A | 5/1994 | Jones |
| 5,338,673 A | 8/1994 | Thepenier et al. |
| 5,364,444 A | 11/1994 | McDoulett, Jr. et al. |
| 5,368,750 A | 11/1994 | Peterscheck et al. |
| 5,370,801 A * | 12/1994 | Sorensen et al. .............. 210/742 |
| 5,374,710 A | 12/1994 | Tsien et al. |
| 5,387,751 A | 2/1995 | Hayden et al. |
| 5,407,817 A | 4/1995 | Lightsey et al. |
| 5,411,568 A | 5/1995 | Moore |
| 5,417,937 A | 5/1995 | Voigt et al. |
| 5,422,015 A | 6/1995 | Angell et al. |
| 5,425,800 A | 6/1995 | Buter et al. |
| 5,427,747 A | 6/1995 | Kong et al. |
| 5,431,788 A | 7/1995 | Jones |
| 5,437,150 A | 8/1995 | Latham et al. |

(Continued)

FOREIGN PATENT DOCUMENTS

EP  0119685  1/1984

(Continued)

OTHER PUBLICATIONS

Information about Related Patents and Patent Applications, see the section of the accompanying Information Disclosure Statement Letter entitled "Related Patents and Patent Applications" for further information.

(Continued)

*Primary Examiner* — Edward Johnson
(74) *Attorney, Agent, or Firm* — Holland & Hart LLP

(57) ABSTRACT

An improved oxidization process may be used to oxidize a wide variety of feedstocks. Oxidation takes place in a reactor where the feedstock is mixed with an oxidizing acid, such as nitric acid. The reaction mixture may also include a secondary oxidizing acid such as sulfuric acid as well as water and/or dissolved and mechanically mixed oxygen gas. The reactor may be maintained at an elevated pressure such as at least approximately 2070 kPa or desirably at least approximately 2800 kPa. The temperature of the reaction mixture may be maintained at no more than 210° C. In the various embodiments described herein, the process may include: combining recycled effluent from the reactor with the feedstock, combining one or more oxidizing acids with the feedstock, comminuting the feedstock to reduce the size of the particles, feeding the feedstock into the high pressure reactor at an approximately constant feed rate, dispersing oxygen gas from the headspace of the reactor into the reaction mixture, and/or removing all or almost all of the gas from the reactor through the liquid effluent.

45 Claims, 5 Drawing Sheets

U.S. PATENT DOCUMENTS

| | | | |
|---|---|---|---|
| 5,443,613 A | 8/1995 | Robinson | |
| 5,453,253 A | 9/1995 | Von Röpenack et al. | |
| 5,454,950 A | 10/1995 | Li et al. | |
| 5,478,549 A | 12/1995 | Koch | |
| 5,482,528 A | 1/1996 | Angell et al. | |
| 5,484,579 A | 1/1996 | O'Brien | |
| 5,491,968 A | 2/1996 | Shouman | |
| 5,492,624 A | 2/1996 | Rozich | |
| 5,498,766 A | 3/1996 | Stuart et al. | |
| 5,501,974 A | 3/1996 | Griffin | |
| 5,512,525 A | 4/1996 | Tenten et al. | |
| 5,512,599 A | 4/1996 | Hiramatsu et al. | |
| 5,516,345 A | 5/1996 | Brown | |
| 5,525,230 A | 6/1996 | Wrigley et al. | |
| 5,536,325 A | 7/1996 | Brink | |
| 5,552,039 A | 9/1996 | McBrayer, Jr. et al. | |
| 5,578,647 A | 11/1996 | Li et al. | |
| 5,582,715 A | 12/1996 | McBrayer, Jr. et al. | |
| 5,591,415 A | 1/1997 | Dassel et al. | |
| 5,641,413 A | 6/1997 | Momont et al. | |
| 5,720,889 A | 2/1998 | McBrayer, Jr. et al. | |
| 5,770,174 A | 6/1998 | Eller et al. | |
| 5,779,164 A | 7/1998 | Chieffalo et al. | |
| 5,814,292 A | 9/1998 | Foster et al. | |
| 5,854,061 A | 12/1998 | Horn et al. | |
| 5,888,389 A | 3/1999 | Griffith et al. | |
| 5,960,368 A | 9/1999 | Pierce et al. | |
| 5,968,362 A | 10/1999 | Russo, Jr. | |
| 5,976,211 A | 11/1999 | Fjelldal et al. | |
| 6,001,243 A | 12/1999 | Eller et al. | |
| 6,049,021 A | 4/2000 | Getman et al. | |
| 6,051,145 A | 4/2000 | Griffith et al. | |
| 6,054,057 A | 4/2000 | Hazlebeck et al. | |
| 6,056,880 A | 5/2000 | Boss et al. | |
| 6,121,179 A | 9/2000 | McBrayer, Jr. et al. | |
| 6,682,578 B2 | 1/2004 | Sower | |
| 6,958,122 B1 | 10/2005 | Gidner et al. | |
| 6,962,562 B2 | 11/2005 | Depelsenaire et al. | |
| 6,966,941 B1 | 11/2005 | Grobler et al. | |
| 7,169,204 B2 | 1/2007 | Greer et al. | |
| 7,662,206 B2 | 2/2010 | Burnham | |
| 7,682,811 B2 | 3/2010 | Leschine et al. | |
| 2001/0008617 A1 | 7/2001 | Robles | |
| 2001/0022290 A1 | 9/2001 | Shiota et al. | |
| 2002/0056690 A1 | 5/2002 | Wegner | |
| 2002/0182710 A1 | 12/2002 | Horn et al. | |
| 2003/0066806 A1 | 4/2003 | Burdeniuc | |
| 2003/0121302 A1 | 7/2003 | Oliver et al. | |
| 2003/0167811 A1 | 9/2003 | Porubcan | |
| 2004/0076567 A1 | 4/2004 | Day et al. | |
| 2007/0062233 A1 | 3/2007 | Burnham | |
| 2008/0047313 A1 | 2/2008 | Johnson et al. | |
| 2008/0182305 A1 | 7/2008 | Foody et al. | |
| 2008/0230484 A1 | 9/2008 | Burnham et al. | |
| 2009/0028767 A1 | 1/2009 | Parker et al. | |
| 2010/0055628 A1 | 3/2010 | McMurry et al. | |
| 2010/0064747 A1 | 3/2010 | Greer et al. | |
| 2010/0120104 A1 | 5/2010 | Reed | |
| 2010/0129909 A1 | 5/2010 | Stuart | |

FOREIGN PATENT DOCUMENTS

| | | | |
|---|---|---|---|
| EP | 0413356 B1 | | 8/1990 |
| EP | 0513186 B1 | | 1/1991 |
| EP | 0 568 736 A1 | | 11/1993 |
| GB | 1407520 | | 6/1973 |
| GB | 1591274 | | 11/1977 |
| JP | 1310794 | | 12/1989 |
| WO | WO 93/14046 | | 7/1993 |
| WO | WO 94/11310 | | 5/1994 |
| WO | WO 94/17216 | | 8/1994 |
| WO | WO 95/26929 | | 10/1995 |
| WO | WO 96/02471 | | 2/1996 |
| WO | WO 96/19412 | | 6/1996 |
| WO | WO 99/35084 | | 7/1999 |
| WO | WO 00/14120 | | 3/2000 |
| WO | WO 2004/099115 A1 | | 11/2004 |
| WO | WO 2004/105974 A2 | | 12/2004 |
| WO | WO 2005/113104 A1 | | 12/2005 |
| WO | WO 2009/059615 A1 | | 5/2009 |

OTHER PUBLICATIONS

Invitation to Pay Additional Fees, PCT/US2010/028340, Jun. 25, 2010 (6 pgs.).

International Search Report and Written Opinion, PCT/US2010/028340, Dec. 8, 2010 (12 pgs.).

\* cited by examiner

AQUEOUS PHASE OXIDATION PROCESS

CROSS-REFERENCE TO RELATED PATENT APPLICATIONS

U.S. Pat. No. 5,814,292, entitled "Comprehensive Energy Producing Methods for Aqueous Phase Oxidation," issued on 29 Sep. 1998, is incorporated herein by reference in its entirety. In the event of a conflict, the subject matter explicitly recited or shown herein controls over any subject matter incorporated by reference. All definitions of a term (express or implied) contained in any of the subject matter incorporated by reference herein are hereby disclaimed. The paragraphs shortly before the claims dictate the meaning to be given to any term explicitly recited herein subject to the disclaimer in the preceding sentence.

BACKGROUND

A number of attempts have been made over the years to develop a process that is capable of effectively and cost efficiently oxidizing a variety of feed materials. Many of these processes were initially developed for use in smelting or the removal of metal from ores. These processes consumed large amounts of energy, emitted noxious gases, and rarely achieved complete recovery of all the metals entering the process. They were also limited to very specific uses related to smelting, which made them largely unsuitable for use with other feed materials.

Other processes have also been developed to oxidize various feed materials. One in particular was an aqueous phase oxidation process that oxidized a feed material in a solution of nitric and sulfuric acid. The reaction occurred in a pressurized reactor that was maintained at a temperature no greater than about 210° C. Oxygen gas was added to reoxidize a substantial portion of the reduction products of nitric acid that were formed during oxidation of the feed materials.

Although this process was a significant advance over conventional techniques at the time, it still suffered from a number of problems. For one, the process used a significant amount of oxygen gas to oxidize the reduction products of nitric acid. The oxygen gas was initially bubbled into the aqueous phase but quickly separated and collected in the headspace of the reactor where it was eventually removed. It was necessary to supply a large amount of oxygen gas to adequately oxygenate the aqueous phase.

Another problem with this process concerned controlling the amount of oxygen gas in the aqueous phase. It was difficult to directly measure the amount of oxygen gas in the aqueous phase. However, it was relatively simple to measure the amount of oxygen gas in the headspace. Consequently, the amount of oxygen gas supplied to the reactor was controlled based on this measurement. Unfortunately, the amount of oxygen gas in the headspace bore a tenuous relationship to the amount of oxygen gas in the aqueous phase. It proved difficult to precisely control the amount of oxygen gas supplied to the aqueous phase.

Other problems associated with this process were manifest when it was attempted to operate it continuously. The reactor was highly pressurized and the pressure fluctuated significantly over time. This made it difficult to introduce feed material into the reactor at a constant rate. The feed material had a tendency to enter in spurts and pauses, which created problems controlling the reaction. Each time a spurt of feed material entered the reactor, a number of parameters would have to be adjusted so that it could remain in the reactor long enough to completely oxidize.

The process was further complicated by variations in the physical characteristics of the feed material, such as particle size, uniformity, moisture content, and the like. These problems were manifest by plugging and clogging at various points up to and including entry into the reactor, unpredictable residence times and reaction rates, process control difficulties, and the like. These problems resulted in oversizing the process equipment and extending the residence times to take into account the inconsistencies between the feed materials.

A number of embodiments of an improved aqueous phase oxidation process are described below. The improved process reduces or eliminates many of the problems and disadvantages associated with conventional aqueous phase oxidation processes.

SUMMARY

Various embodiments of an improved process for oxidizing a feedstock are described herein. The process can be used to oxidize any suitable organic or inorganic feedstock. In one embodiment, the process is used to oxidize municipal and/or farm waste, e.g., dewatered sewage, municipal sludge cake, or animal manure.

The feedstock is oxidized in an aqueous reaction mixture by one or more oxidizing acids. In one embodiment, the oxidizing acid is regenerated in situ. Oxygen gas may be supplied to the reaction mixture to reoxidize the reduction products of the oxidizing acid. The reactor may be maintained at suitable pressures and temperatures to facilitate regeneration of the oxidizing acid. Suitable oxidizing acids that may be used in the process include nitric acid and sulfuric acid.

In some embodiments, the feedstock may be processed before being fed to the reactor to give it uniform physical properties and to render it better suited to be rapidly and efficiently oxidized. This processing may include comminuting the feedstock so that the particles have a uniform size that allows the feedstock to easily enter the reactor, combining the feedstock with recycled effluent from the reactor, and/or combining the feedstock with one or more oxidizing acids before the feedstock enters the reactor.

Once in the reactor, the feedstock is oxidized rapidly and efficiently. In some embodiments, gas from the headspace of the reactor, in particular, oxygen gas, is dispersed into the reaction mixture. This may be accomplished with a hollow impeller that causes gas from the headspace to flow through the impeller and into the reaction mixture as the impeller rotates. The result is that the composition of the gas in the reaction mixture is close to or the same as the composition of the gas in the headspace. In particular, the concentration of oxygen gas in the dissolved and undissolved gas portion of the reaction mixture is similar, if not the same, as the concentration of the oxygen gas in the headspace. The reaction mixture may be mixed vigorously to increase the total amount of oxygen gas the enters the mixture.

The gas in the reaction mixture may be removed as part of the liquid effluent stream. In other words, the gas that is dissolved and undissolved in the reaction mixture is removed with the reaction mixture effluent. A separate gas removal port on the reactor is unnecessary, but may be provided for other purposes.

Once the effluent exits the reactor, it is cooled and the pressure is reduced to allow the gas to separate. The effluent may be vigorously agitated to speed up the separation and make it more complete. A portion of the effluent may be recycled back to the beginning of the process and combined with the feedstock as mentioned above.

In one embodiment, the initial feedstock is combined with either or both of the effluent from the reactor or one or more oxidizing acids to form a primary feedstock. The primary feedstock is fed into the reactor where it is oxidized. The primary feedstock is part of the reaction mixture which also includes nitric acid and a secondary oxidizing acid.

In another embodiment, the initial feedstock is combined with either or both of the effluent from the reactor or one or more oxidizing acids to form the primary feedstock. The primary feedstock is fed into the reactor where it is oxidized. The primary feedstock is part of the reaction mixture which also includes nitric acid and oxygen gas. The oxygen gas is supplied to the reaction mixture in an amount that is sufficient to regenerate at least a majority of the nitric acid. The reaction mixture is maintained at a temperature that is no more than approximately 210° C.

In another embodiment, the initial feedstock is combined with either or both of the effluent from the reactor or one or more oxidizing acids to form the primary feedstock. The primary feedstock is oxidized in the reactor. The primary feedstock is part of the reaction mixture which also includes nitric acid. The pressure in the reactor is maintained at at least approximately 2070 kPa.

In another embodiment, the initial feedstock is combined with either or both of the effluent from the reactor or one or more oxidizing acids to form the primary feedstock. The primary feedstock is oxidized in the reactor. The primary feedstock is part of the reaction mixture which also includes nitric acid, a secondary oxidizing acid, and oxygen gas. The oxygen gas is supplied to the reaction mixture in an amount that is sufficient to regenerate at least a majority of the nitric acid. The reaction mixture is maintained at a temperature that is no more than approximately 210° C. The pressure in the reactor is maintained at at least approximately 2070 kPa.

In another embodiment, the initial feedstock is comminuted to form the primary feedstock where the largest dimension of at least approximately 95% of the particles in the primary feedstock is no more than 7 mm. The primary feedstock is oxidized in the reactor where it is part of the reaction mixture which also includes nitric acid and the secondary oxidizing acid.

In another embodiment, the initial feedstock is comminuted to form the primary feedstock where the largest dimension of at least approximately 95% of the particles in the primary feedstock is no more than 7 mm. The primary feedstock is oxidized in the reactor where it is part of the reaction mixture which also includes nitric acid and oxygen gas. The oxygen gas is supplied to the reaction mixture in an amount that is sufficient to regenerate at least a majority of the nitric acid. The temperature of the reaction mixture is maintained at no more than approximately 210° C.

In another embodiment, the initial feedstock is comminuted to form the primary feedstock where the largest dimension of at least approximately 95% of the particles in the primary feedstock is no more than 7 mm. The primary feedstock is oxidized in the reactor where it is part of the reaction mixture which also includes nitric acid. The pressure in the reactor is maintained at at least approximately 2070 kPa.

In another embodiment, the initial feedstock is comminuted to form the primary feedstock where the largest dimension of at least approximately 95% of the particles in the primary feedstock is no more than 7 mm. The primary feedstock is fed into the reactor at an approximately constant feed rate and oxidized. The primary feedstock is part of the reaction mixture which also includes nitric acid, a secondary oxidizing acid, and oxygen gas. The oxygen gas is supplied to the reaction mixture in an amount that is sufficient to regenerate at least a majority of the nitric acid. The temperature of the reaction mixture is maintained at no more than approximately 210° C. The pressure in the reactor is maintained at at least approximately 2070 kPa.

In another embodiment, the feedstock is fed into the reactor at a feed rate that is approximately constant. The feedstock is oxidized in the reactor where it is part the reaction mixture which also includes nitric acid and a secondary oxidizing acid. The pressure in the reactor is maintained at at least approximately 2070 kPa. The feed rate is approximately constant even though the pressure in the reactor may vary from approximately 2070 kPa to 6,900 kPa.

In another embodiment, the feedstock is fed into the reactor by a feeding device that is powered hydraulicly or by a gearmotor. The feedstock is oxidized in the reactor where it is part of the reaction mixture which also includes nitric acid and a secondary oxidizing acid.

In another embodiment, a first amount of the feedstock is fed into the pressurized reactor by the feeding device. The feeding device is isolated from the pressurized reactor and filled with a second amount of the feedstock. The second amount of the feedstock is fed into the pressurized reactor by the feeding device. The feedstock is oxidized in the pressurized reactor where it is part of the reaction mixture which also includes nitric acid and a secondary oxidizing acid. The pressure in the reactor is maintained at at least approximately 2070 kPa.

In another embodiment, the feedstock is fed into the reactor at a feed rate that is approximately constant. The feedstock is oxidized in the reactor where it is part of the reaction mixture which also includes nitric acid, a secondary oxidizing acid, and oxygen gas. The oxygen gas is supplied to the reaction mixture in an amount that is sufficient to regenerate at least a majority of the nitric acid. The temperature of the reaction mixture is maintained at no more than approximately 210° C. The pressure in the reactor is maintained at at least approximately 2070 kPa. The feed rate is approximately constant even though the pressure in the reactor may vary from approximately 2070 kPa to 6,900 kPa.

In another embodiment, the feedstock is fed into the reactor at a feed rate that fluctuates no more than approximately 10% per hour. The feedstock is oxidized in a reactor where it is part of the reaction mixture which also includes nitric acid. The pressure in the reactor is maintained at at least approximately 2070 kPa. The feed rate fluctuates no more than approximately 10% per hour even though the pressure in the reactor may vary from approximately 2070 kPa to 6,900 kPa.

In another embodiment, the feedstock is fed into the reactor with a feeding device that is powered hydraulicly or by a gearmotor. The feedstock is oxidized in the reactor where it is part of the reaction mixture which also includes nitric acid and oxygen gas. The oxygen gas is supplied to the reaction mixture in an amount that is sufficient to regenerate at least a majority of the nitric acid. The temperature of the reaction mixture is maintained at no more than approximately 210° C.

In another embodiment, the feedstock is fed into the reactor with a feeding device that is powered hydraulicly or by a gearmotor. The feedstock is oxidized in the reactor where it is part of the reaction mixture which also includes nitric acid. The pressure in the reactor is maintained at at least approximately 2070 kPa.

In another embodiment, the feedstock is fed into the reactor with a feeding device that is powered hydraulicly or by a gearmotor. The feedstock is oxidized in the reactor where it is part of the reaction mixture which also includes nitric acid, a secondary oxidizing acid, and oxygen gas. The oxygen gas is supplied to the reaction mixture in an amount that is sufficient to regenerate at least a majority of the nitric acid. The temperature of the reaction mixture is maintained at no more than approximately 210° C. The pressure of the reactor is maintained at at least approximately 2070 kPa.

In another embodiment, a first amount of the feedstock is fed into a pressurized reactor by the feeding device. The feeding device is isolated from the pressurized reactor and filled with a second amount of the feedstock. The second amount of the feedstock is fed into the pressurized reactor by the feeding device. The feedstock is oxidized in the pressurized reactor where it is part of the reaction mixture that also includes nitric acid. The pressure in the pressurized reactor is maintained at at least approximately 2070 kPa. The first amount of the feedstock and the second amount of the feedstock are fed into the pressurized reactor at a feed rate that fluctuates no more than approximately 10% per hour.

In another embodiment, a first amount of the feedstock is fed into the pressurized reactor by the feeding device. The feeding device is isolated from the pressurized reactor and filled with a second amount of the feedstock. The second amount of the feedstock is fed into the pressurized reactor by the feeding device. The feedstock is oxidized in the pressurized reactor where it is part of the reaction mixture that also includes nitric acid, a secondary oxidizing acid, and oxygen gas. The temperature of the reaction mixture is maintained at no more than approximately 210° C. The pressure in the reactor is maintained at at least approximately 2070 kPa. The first amount of the feedstock and the second amount of the feedstock are fed into the pressurized reactor at a feed rate that is approximately constant.

In another embodiment, the feedstock is oxidized in the reactor where it is part of the reaction mixture which also includes nitric acid and a secondary oxidizing acid. The gas from the headspace of the reactor is dispersed into the reaction mixture.

In another embodiment, the feedstock is oxidized in the reactor where it is part of the reaction mixture which also includes nitric acid and oxygen gas. The oxygen gas is supplied to the reactor and dispersed from the headspace into the reaction mixture in a manner that is sufficient to regenerate at least a majority of the nitric acid. The temperature of the reaction mixture is maintained at no more than approximately 210° C.

In another embodiment, the feedstock is oxidized in a reactor where it is part of the reaction mixture which also includes nitric acid and a secondary oxidizing acid. The concentration of dissolved and undissolved oxygen gas in the gaseous portion of the reaction mixture is maintained within approximately 25% of the concentration of oxygen gas in a headspace of the reactor.

In another embodiment, the feedstock is oxidized in a reactor where it is part of the reaction mixture which also includes nitric acid, a secondary oxidizing acid, and oxygen gas. The oxygen gas is supplied to the reactor and dispersed from the headspace of the reactor into the reaction mixture in a manner that is sufficient to regenerate at least a majority of the nitric acid. The temperature of the reaction mixture was maintained at no more than approximately 210° C. The pressure in the reactor was maintained at at least approximately 2070 kPa.

In another embodiment, the feedstock is oxidized in a reactor where it is part of the reaction mixture which also includes nitric acid. Gas from the headspace of the reactor is dispersed into the reaction mixture. The pressure in the reactor is maintained at at least approximately 2070 kPa.

In another embodiment, the feedstock is oxidized in the reactor where it is part of the reaction mixture which also includes nitric acid and oxygen gas. The oxygen gas is supplied to the reactor mixture in an amount that is sufficient to regenerate at least a majority of the nitric acid. The concentration of dissolved and undissolved oxygen gas in the gaseous portion of the reaction mixture is maintained within approximately 25% of the concentration of oxygen gas in the headspace of the reactor. The temperature of the reaction mixture is maintained at no more than approximately 210° C.

In another embodiment, the feedstock is oxidized in the reactor where it is part of the reaction mixture which also includes nitric acid. The concentration of dissolved and undissolved oxygen gas in the gaseous portion of the reaction mixture is maintained within approximately 25% of the concentration of oxygen gas in the headspace of the reactor. The pressure in the reactor is maintained at at least approximately 2070 kPa.

In another embodiment, the feedstock is oxidized in the reactor where it is part of the reaction mixture which also includes nitric acid, a secondary oxidizing acid, and oxygen gas. The oxygen gas is supplied to the reaction mixture in an amount that is sufficient to regenerate at least a majority of the nitric acid. The concentration of dissolved and undissolved oxygen gas in the gaseous portion of the reaction mixture is maintained within approximately 25% of the concentration of oxygen gas in the headspace of the reactor. The temperature of the reaction mixture is maintained at no more than approximately 210° C. The pressure in the reactor is maintained at at least approximately 2070 kPa.

In another embodiment, the feedstock is oxidized in the reactor where it is part of the reaction mixture which also includes nitric acid and a secondary oxidizing acid. Gas is supplied to the reactor, and reactor effluent is removed from the reactor. Also, at least approximately 94 wt. % of the reaction mixture that exits the reactor does so in the reactor effluent, and at least approximately 94 wt. % of gas that exits the reactor does so in the reactor effluent.

In another embodiment, the feedstock is oxidized in the reactor where it is part of the reaction mixture which also includes nitric acid and oxygen gas. Gas, including oxygen gas, is supplied to the reactor. The reactor effluent is removed from the reactor. The temperature of the reaction mixture is maintained at no more than approximately 210° C. The oxygen gas is supplied to the reaction mixture in an amount that is sufficient to regenerate at least a majority of the nitric acid Also, at least approximately 94 wt. % of the reaction mixture that exits the reactor does so in the reactor effluent, and at least approximately 94 wt. % of gas that exits the reactor does so in the reactor effluent.

In another embodiment, the feedstock is oxidized in the reactor where it is part of the reaction mixture which also includes nitric acid and a secondary oxidizing acid. Oxygen gas is supplied to the reactor, and the reactor effluent is removed from the reactor. The amount of oxygen gas in the reactor effluent is measured and the supply of oxygen gas to the reactor is adjusted based on the amount of oxygen gas measured in the reactor effluent.

In another embodiment, the feedstock is oxidized in the reactor where it is part of the reaction mixture which also includes nitric acid, a secondary oxidizing acid, and oxygen gas. Gas, including oxygen gas, is supplied to the reactor. Reactor effluent is removed from the reactor. The temperature of the reaction mixture is maintained at no more than approximately 210° C. The pressure in the reactor is maintained at at least approximately 2070 kPa. The oxygen gas is supplied to the reaction mixture in an amount that is sufficient to regenerate at least a majority of the nitric acid. Also, at least approximately 94 wt. % of the reaction mixture that exits the reactor does so in the reactor effluent, and at least approximately 94 wt. % of gas that exits the reactor does so in the reactor effluent.

In another embodiment, the feedstock is oxidized in the reactor where it is part of the reaction mixture which also includes nitric acid. Gas is supplied to the reactor, and the reactor effluent is removed from the reactor. The pressure in the reactor is maintained at at least approximately 2070 kPa. Also, at least approximately 94 wt. % of the reaction mixture that exits the reactor does so in the reactor effluent, at least approximately 94 wt. % of gas that exits the reactor does so in the reactor effluent.

In another embodiment, the feedstock is oxidized in the reactor where it is part of the reaction mixture which also includes nitric acid and oxygen gas. The oxygen gas is supplied to the reactor in an amount that is sufficient to regenerate at least a majority of the nitric acid. The reactor effluent is removed from the reactor. The amount of oxygen gas in the reactor effluent is measured and the supply of oxygen gas is adjusted accordingly, The temperature of the reaction mixture is maintained at no more than approximately 210° C.

In another embodiment, the feedstock is oxidized in the reactor where it is part of the reaction mixture which also includes nitric acid. Gas is supplied to the reactor, and the reactor effluent is removed from the reactor. The amount of oxygen gas in the reactor effluent is measured and the supply of oxygen gas is adjusted accordingly. The pressure in the reactor is maintained at at least approximately 2070 kPa.

In another embodiment, the feedstock is oxidized in the reactor where it is part of the reaction mixture which also includes nitric acid, a secondary oxidizing acid, and oxygen gas. The oxygen gas is supplied to the reactor, and the reactor effluent is removed from the reactor. The amount of oxygen gas in the reactor effluent is measured and the supply of oxygen gas is adjusted accordingly. The temperature of the reaction mixture is maintained at no more than approximately 210° C. The pressure in the reactor is maintained at at least approximately 2070 kPa. The oxygen gas is supplied to the reaction mixture in an amount that is sufficient to regenerate at least a majority of the nitric acid.

It should be appreciated that all pressures referred to herein are gauge pressures unless stated otherwise. Also, all references to molarity are given at standard conditions for temperature and pressure—i.e., 0° C. and 101.325 kPa—unless stated otherwise.

The foregoing and other features, utilities, and advantages of the subject matter described herein will be apparent from the following more particular description of certain embodiments as illustrated in the accompanying drawings.

DRAWINGS

DETAILED DESCRIPTION

The improved oxidation process, in its various embodiments, can be used to oxidize a wide variety of materials. The process can be used to oxidize organic and/or inorganic material with very similar results in the sense that the feed material is completely or nearly completely oxidized, although the reaction products may be very different. Specific materials that may be oxidized using this process include, but are not limited to, municipal and farm waste including dewatered sewage, municipal sludge cake and animal manure; slaughter house waste that includes blood, bone, and flesh; petroleum based wastes such as plastics, rubber, and paints; tires; wood pulp; hazardous materials such as nerve gas, municipal garbage, and metal ore such as sulfide containing ores that are typically processed in smelters.

Although the process has a wide variety of uses, the following description is provided primarily in the context of oxidizing sewage and/or manure based feedstocks. It should be appreciated, however, that the concepts and features described herein generally apply to the oxidation of other materials. Also, as each embodiment is described, it should be understood that the features, advantages, characteristics, etc., of one embodiment may be applied to any other embodiment to form one or more additional embodiments unless noted otherwise. Furthermore, the principles, features, characteristics, and parameters described in the U.S. Pat. No. 5,814,292, which is incorporated herein by reference, can be integrated into or substituted for various aspects of the improved process.

Figure 1:
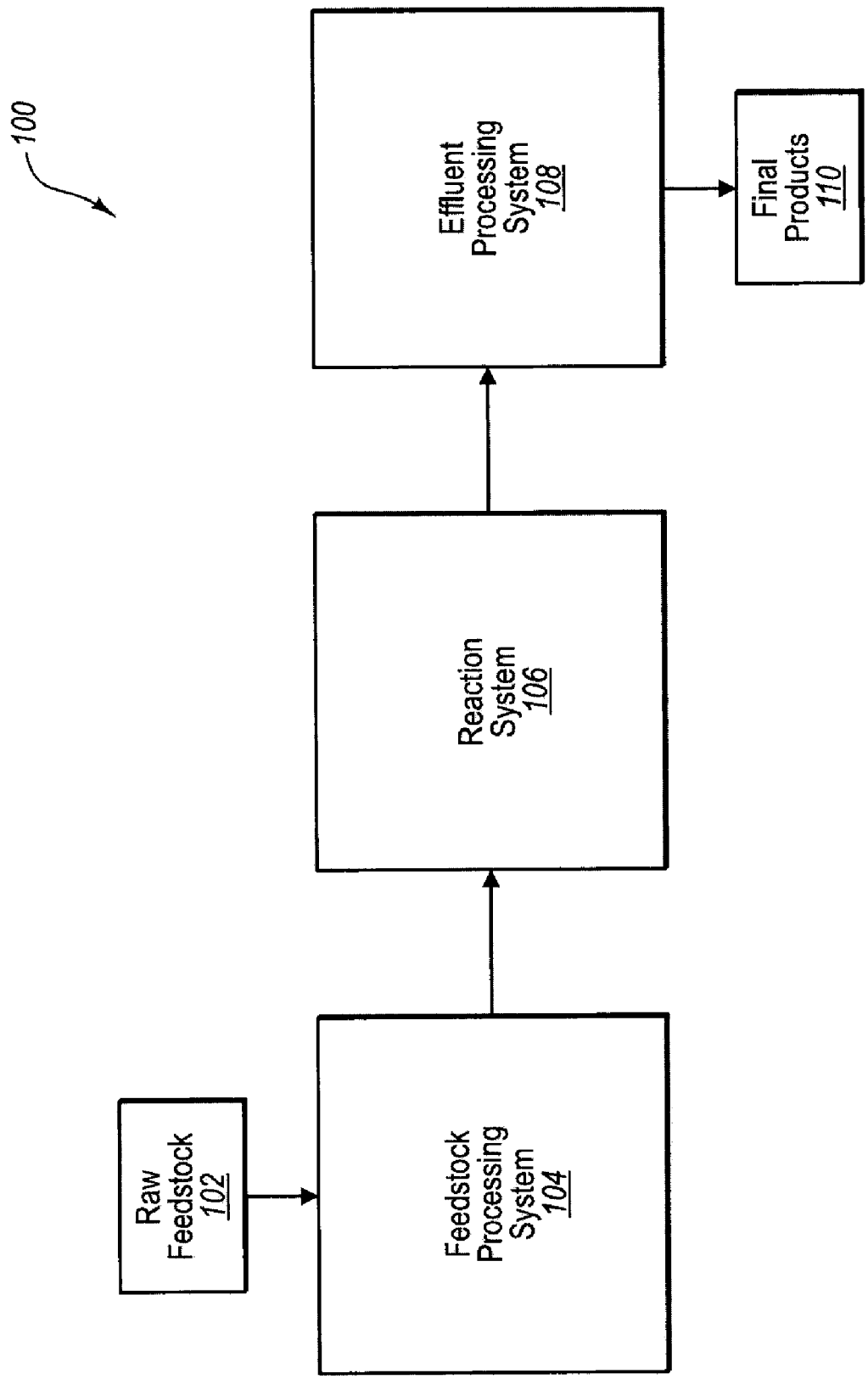
FIG. 1 is a block diagram of an improved aqueous phase oxidation process that includes a feedstock processing system, a reaction system, and an effluent processing system.

Referring to FIG. 1, a block diagram of an improved aqueous phase oxidation process 100 is shown. The process 100 includes a feedstock processing system 104, a reaction system 106, and an effluent processing system 108. The raw feedstock 102 enters the feedstock processing system 104 where it is modified and/or processed in a number of ways to produce a primary feedstock. The primary feedstock is fed to the reaction system 106 where it is oxidized. The effluent from the reaction system 106 enters the effluent processing system 108 where it is separated and/or otherwise processed to produce final products 110. Each system 104, 106, 108 is described in greater detail.

The improved process is conceptually divided into the three systems 104, 106, 108 for purposes of description. It should be appreciated, however, that the dividing line between each system 104, 106, 108 is somewhat arbitrary and does not represent a hard and fast boundary. Indeed, various components of one system could just as easily be considered part of a different system. With this in mind, the three systems 104, 106, 108 should be viewed as nothing more than a conceptual framework from which to describe the overall operation of the process.

As discussed above, the raw feedstock 102 may be any suitable feedstock that is capable of being oxidized in the manner described herein. In one embodiment, the feedstock is a sewage or manure based material that is approximately 3% to 20% solids (e.g., 18% solids).

Figure 2:
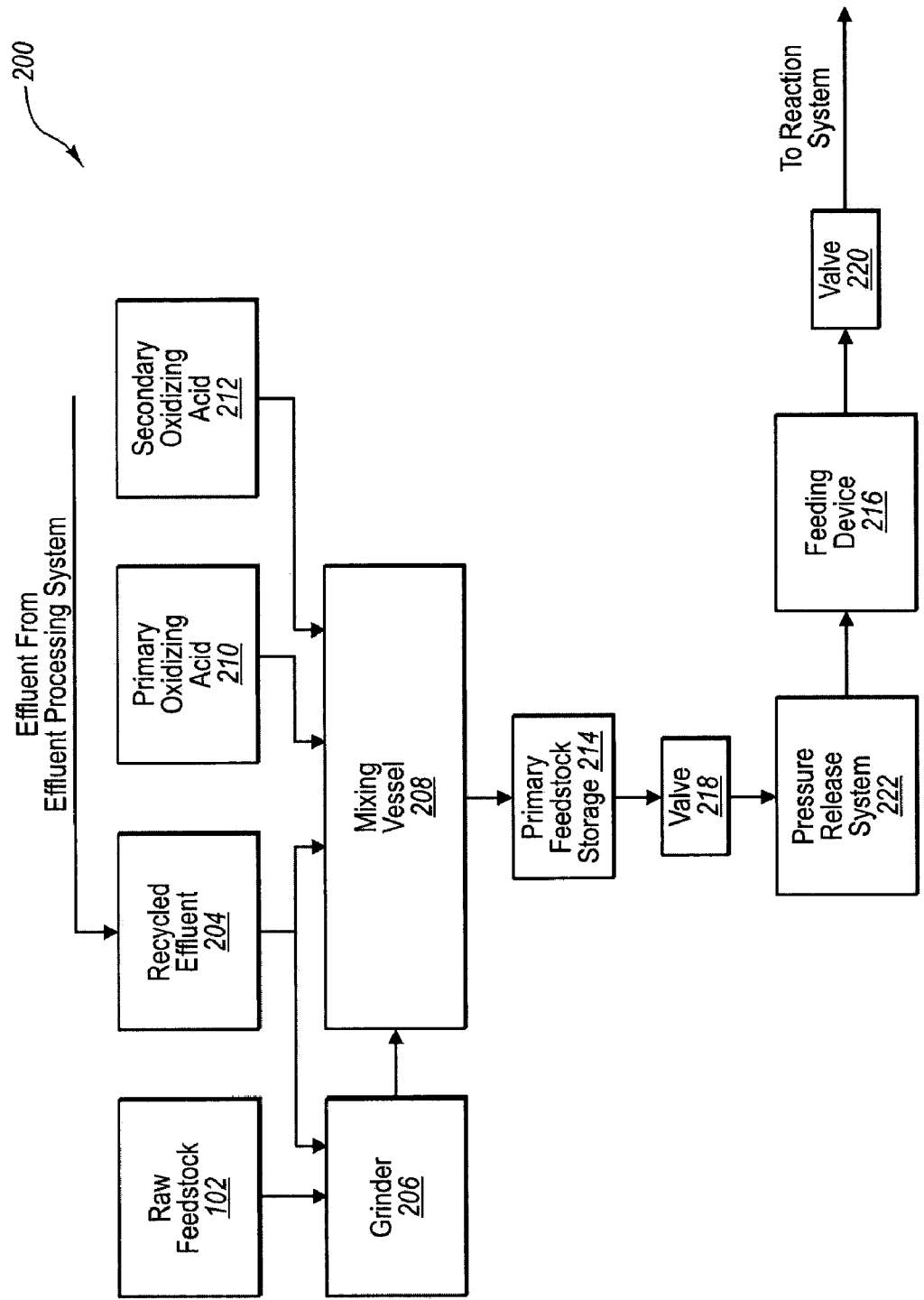
FIG. 2 is a block diagram of one embodiment of the feedstock processing system from FIG. 1.

FIG. 2 shows a block diagram of one embodiment of the feedstock processing system 200. The raw feedstock 102 is initially mixed with recycled effluent 204 to form an intermediate feedstock. The grinder 206 comminutes the intermediate feedstock thereby forming a comminuted feedstock. Comminuting the intermediate feedstock reduces the size of the particles and makes the intermediate feedstock more uniform.

The recycled effluent 204 may be combined with the raw feedstock 102 in the grinder 206, as shown in FIG. 2, or before entering the grinder 206. If they are combined in the grinder 206, the grinding action may serve to mix the two materials together. If they are combined before entering the grinder 206, the recycled effluent 204 and the raw feedstock 102 may be mixed in a separate vessel.

The recycled effluent 204 is added in an amount that is sufficient to create a slurry that doesn't plug or clog the grinder 206 and/or facilitates later processing and transport. The amount of recycled effluent 204 that is added may vary depending on the characteristics of the raw feedstock 102. Generally, larger quantities of the recycled effluent 204 are used if the raw feedstock 102 is dry, while smaller quantities, or possibly none at all, are used if the raw feedstock 102 already includes a suitable amount of liquid. It is also possible that certain feedstocks may be so wet that they must be dewatered before entering the process 100.

In certain embodiments, particularly those where the raw feedstock 102 is sewage or manure based material, the volume ratio of the recycled effluent 204 to the raw feedstock 102 in the intermediate feedstock may be approximately 0.5 to 1.5 or, desirably, approximately 0.75 to 1.25. In one embodiment, approximately equal parts by volume of the recycled effluent 204 and the raw feedstock 102 are combined to form the intermediate feedstock.

The recycled effluent 204 may be supplied at an elevated temperature so that it heats the raw feedstock 102 when the two are mixed together. The resulting intermediate feedstock may be significantly above ambient temperature. The recycled effluent 204 may be supplied at a temperature of approximately 40° C. to 90° C. or, desirably, 50° C. to 75° C. For example, the intermediate feedstock may be approximately 37° C. to 50° C.

As discussed in greater detail below, the effluent from reactor 402 (FIG. 4) is heated by the exothermic oxidation of the feedstock. The recycled effluent 204 may be at an elevated temperature simply because it has not cooled (either naturally or actively cooled) after leaving the reactor 402. The recycled effluent 204 may also be heated in a heat exchanger to keep it at an elevated temperature. In one example, described in greater detail below, the recycled effluent 204 is heated in a heat exchanger using heat from the effluent that has just left the reactor 402. The recycled effluent 204 may be stored in an insulated tank or vessel before being mixed with the raw feedstock 102 to maintain it at an elevated temperature.

The intermediate feedstock is comminuted to reduce the particle sizes, improve the uniformity of the feedstock, make the feedstock more amenable to evenly controlled pumping, and keep the solids suspended in the slurry. This makes it easier to feed the feedstock into the reactor 402, which is often operated at an elevated pressure, without plugging the entry opening.

The size and uniformity are also important because the reaction rate varies significantly based on these factors, especially particle size. Larger particles generally need longer residence times to completely oxidize. If the feedstock has both large and small particles, the large particles tend to dictate the residence time. Thus, it is desirable to create a feedstock that generally has small, uniform particles. This is especially true when the feedstock includes organic matter such as sewage and/or manure.

Increasing the reaction rate by comminuting the feedstock makes it possible to reduce the size of the reactor 402 and/or increase the feed rate of the feedstock into the reactor 402. Either adjustment has a beneficial effect on the economics of the process 100.

In one embodiment, the largest dimension of at least approximately 95% of the particles in the comminuted feedstock is no more than 7 mm, no more than 4 mm, no more than 2.5 mm, desirably, no more than 1.5 mm, or, suitably, no more than 0.5 mm. In another embodiment, the largest dimension of at least approximately 98% of the particles in the comminuted feedstock is no more than 7 mm, no more than 4 mm, no more than 2.5 mm, desirably, no more than 1.5 mm, or, suitably, no more than 0.5 mm. In yet another embodiment, the largest dimension of at least substantially all of the particles in the comminuted feedstock is no more than 7 mm, no more than 4 mm, no more than 2.5 mm, desirably, no more than 1.5 mm, or, suitably, no more than 0.5 mm.

Returning to FIG. 2, the comminuted feedstock moves from the grinder 206 to a mixing vessel 208 where it is combined with a primary oxidizing acid or first acid 210 and a secondary oxidizing acid or second acid 212 to form a primary feedstock. Additional amounts of the recycled effluent 204 may be combined in the vessel 208 to produce the desired concentration of the acids 210, 212 or to alter the consistency or other properties of the feedstock.

It has been found that pre-treating the feedstock in this manner increases the rate of the redox reaction in the reactor 402, particularly for feedstock that includes organic matter such as sewage and/or manure. The acids 210, 212 initiate de-lignination of the organic fibers and other organic matter in the primary feedstock. De-lignination is beneficial because it further reduces the size of the particles in the feedstock and exposes them to chemical attack in the reaction system 106.

In the embodiment shown in FIG. 2, de-lignination begins when the recycled effluent 204, which includes the acids 210, 212, is first combined with the raw feedstock 102. Thus, de-lignination is initiated when the recycled effluent 204 is combined with the raw feedstock 102 in the grinder 206 and accelerates when the additional acids 210, 212 are added in the vessel 208.

The primary oxidizing acid 210 and the secondary oxidizing acid 212 are added until the concentration of the acids 210, 212 in the primary feedstock, excluding solids (i.e., the concentration of the primary feedstock excluding the solids portion), is approximately the same as the concentration of the acids 210, 212, respectively, in the reactor 402 at start-up.

The primary oxidizing acid 210 may be nitric acid, and the secondary oxidizing acid 212 may be sulfuric acid. The nitric acid functions as the oxidizing agent to oxidize the feedstock. The nitric acid is included in an amount that is sufficient to rapidly and completely oxidize the feedstock.

The sulfate ions of the sulfuric acid convert the salt forming reaction products into stable sulfate salts, thereby leaving the nitric acid in the acid state to continue as the primary oxidant. The sulfate reacts with nitrogen containing compounds to prevent the formation of ammonium nitrate, an explosive, and/or other undesirable reaction products. Instead, the sulfate reacts with nitrogen compounds to form ammonium sulfate. The sulfuric acid is provided in an amount that is sufficient to prevent the formation of ammonium nitrate, but not enough to precipitate sulfur or volatilize significant amounts of the sulfuric acid.

In one embodiment, the nitric acid may be added to achieve a concentration in the primary feedstock, excluding solids, of at least approximately 0.08 mol/L, desirably, at least approximately 0.5 mol/L, or, suitably, at least approximately 0.84 mol/L. In another embodiment, the nitric acid may be added to achieve a concentration in the primary feedstock, excluding solids, of no more than approximately 4.2 mol/L, desirably, no more than approximately 3.3 mol/L, or, suitably, no more than approximately 2.5 mol/L. In yet another embodiment, the nitric acid may be added to achieve a concentration in the primary feedstock, excluding solids, of approximately 0.08 mol/L to 4.2 mol/L, desirably, approximately 0.5 mol/L to 3.3 mol/L, or, suitably, approximately 0.84 mol/L to 2.5 mol/L.

On a weight basis, the nitric acid may be added to achieve a concentration in the primary feedstock, excluding solids, of at least approximately 0.5 wt. %, desirably, at least approximately 3 wt. %, or, suitably, at least approximately 5 wt. %. In another embodiment, the nitric acid may be added to achieve a concentration in the primary feedstock, excluding solids, of no more than approximately 25 wt. %, desirably, no more than approximately 20 wt. %, or, suitably, no more than approximately 15 wt. %. In yet another embodiment, the nitric acid may be added to achieve a concentration in the primary feedstock, excluding solids, of approximately 0.5 wt. % to 25 wt. %, desirably, approximately 3 wt. % to 20 wt. %, or, suitably, approximately 5 wt. % to 15 wt. %.

With regard to sulfuric acid, in one embodiment, the sulfuric acid may be added to achieve a concentration in the primary feedstock, excluding solids, of at least approximately 0.1 mol/L, desirably, at least approximately 0.12 mol/L, or, suitably, at least approximately 0.16 mol/L. In another embodiment, the sulfuric acid may be added to achieve a concentration in the primary feedstock, excluding solids, of no more than approximately 1 mol/L, desirably, no more than approximately 0.54 mol/L, or, suitably, no more than approximately 0.32 mol/L. In yet another embodiment, the sulfuric acid may be added to achieve a concentration in the primary feedstock, excluding solids, of approximately 0.1 mol/L to 1 mol/L, desirably, approximately 0.12 mol/L to 0.54 mol/L, or, suitably, approximately 0.16 mol/L to 0.32 mol/L.

On a weight basis, the sulfuric acid may be added to achieve a concentration in the primary feedstock, excluding solids, of at least approximately 0.9 wt. %, desirably, at least approximately 1.1 wt. %, or, suitably, at least approximately 1.5 wt. %. In another embodiment, the sulfuric acid may be added to achieve a concentration in the primary feedstock, excluding solids, of no more than approximately 10 wt. %, desirably, no more than approximately 5 wt. %, or, suitably, no more than approximately 3 wt. %. In yet another embodiment, the sulfuric acid may be added to achieve a concentration in the primary feedstock, excluding solids, of approximately 0.9 wt. % to 10 wt. %, desirably, approximately 1.1 wt. % to 5 wt. %, or, suitably, approximately 1.5 wt. % to 3 wt. %.

The mixing vessel 208 may be any suitable tank, pipe, or other vessel that is capable of holding and/or mixing the materials. The mixing vessel 208 should be made of a material that is chemically resistant to the acids 210, 212. Suitable materials include plastic, stainless steel, titanium, or the like. In an alternate embodiment, the grinder 206 and the mixing vessel 208 may be combined together so that everything is comminuted and/or mixed in the same vessel.

As shown in FIG. 2, the primary feedstock exits the mixing vessel 208 and is stored in a storage vessel or tank 214 before it is fed into the reactor 402. In one embodiment, the storage vessel 214 may be insulated to maintain the temperature of the primary feedstock and conserve energy. It should be noted that it is generally not desirable to store the primary feedstock for a long period of time before feeding it into the reactor 402. The presence of the acids 210, 212 may cause the primary feedstock to separate and the texture to change in a way that can make it difficult to feed into the reactor 402.

The primary feedstock is now prepared to be fed into the reactor 402. This is accomplished using one or more feeding devices 216. In one embodiment, the primary feedstock is transferred to the feeding device 216 via a low pressure pump and a combination of vacuum and gravity flow. It should be appreciated, however, that any suitable method may be used to transfer the primary feedstock to the feeding device 216.

The feeding device 216 is used to feed the primary feedstock into the reactor 402 at a steady rate. It has been discovered that relatively minor fluctuations in the feed rate can cause large fluctuations in the redox reaction. If the feed rate drops, the reactor 402 is starved and if the feed rate climbs, the reactor 402 is overfed.

The redox reaction is much more sensitive to feed rate fluctuations than it is to other parameters such as temperature and pressure. For this reason, it is desirable to tightly control the feed rate. However, this is not a simple matter since the reactor 402 experiences relatively large fluctuations in pressure and temperature. The pressure swings make it particularly difficult to feed the primary feedstock into the reactor 402 at a steady rate.

The feeding device 216 may have any suitable configuration that allows it to feed the primary feedstock at a steady rate. In one embodiment, the feeding device 216 is actuated or powered hydraulicly. For example, the feeding device 216 may include one or more hydraulic rams that dispense or force the primary feedstock into the reactor 402. One example of a suitable hydraulicly powered feeding device is a cycling ram pump.

In another embodiment, the feeding device 216 is actuated or powered by a gearmotor. For example, the feeding device 216 includes a gearmotor that turns a screw which, in turn, feeds the primary feedstock into the reactor 402. The feeding device 216 may be configured so that pressure fluctuations in the reactor 402, even up to the reactor's safe operating pressure limit of approximately 13,800 kPa, do not significantly change the feed rate.

In one embodiment, the feeding device 216 is an extruder and/or injector that is hydraulically or gear actuated. Multiple feeding devices 216 may be used to provide an uninterrupted supply of the primary feedstock to the reactor 402. The multiple feeding devices 216 may be sequentially activated and refilled. When one feeding device 216 is injecting the feedstock into the reactor 402, another feeding device 216 may be refilled with the primary feedstock. Also, the use of multiple feeding devices 216 is advantageous because it allows one or more devices 216 to be offline for maintenance or repairs while the remainder of the devices 216 provide a continuous supply of feedstock to the reactor 402.

The feeding device 216 may feed the primary feedstock into the reactor at a rate that fluctuates no more than approximately 10% per hour, desirably, no more than approximately 5% per hour, or, suitably no more than approximately 2% per hour. In another embodiment, the feeding device 216 feeds the primary feedstock into the reactor at a feed rate that is approximately constant. The feeding device 216 is capable of maintaining these feed rates even though the pressure in the reactor 402 may vary from approximately 2070 kPa to 6,900 kPa.

The feeding device 216 is exposed to the high pressure of the reactor 402 when it is feeding the primary feedstock into the reactor 402. However, the feeding device 216 is at a low pressure when it is filled with the primary feedstock from the storage vessel 214. The valves 218, 220 may be used to selectively isolate the feeding device 216 from the reactor 402 during feeding and refilling operations. The valve 218 is closed and the valve 220 is open when the feeding device 216 injects the primary feedstock into the reactor 402. The valve 220 is closed and the valve 218 is open when the feeding device 216 is refilled with the primary feedstock.

The valves 218, 220 may also be used to isolate the feeding device 216 so that it can be repaired while the reactor 402 remains in operation. Moreover, the valves 218, 220 can also prevent backflow from the reactor 402 into the feedstock processing system 104 during an overpressure event. It should be appreciated that although the valves 218, 220 are depicted as being separate from the feeding device 216, the valves 218, 220 may be provided as integral components of the feeding device 216.

A pressure release system 222 may be provided that allows the feeding device 216 to transition from a high pressure state to a low pressure state without causing undue wear on the components and/or blowback into the mixing vessel 208 when the valve 218 is opened. In one embodiment, the pressure release system may include a tank that is capable of absorbing excess pressure.

Figure 3:
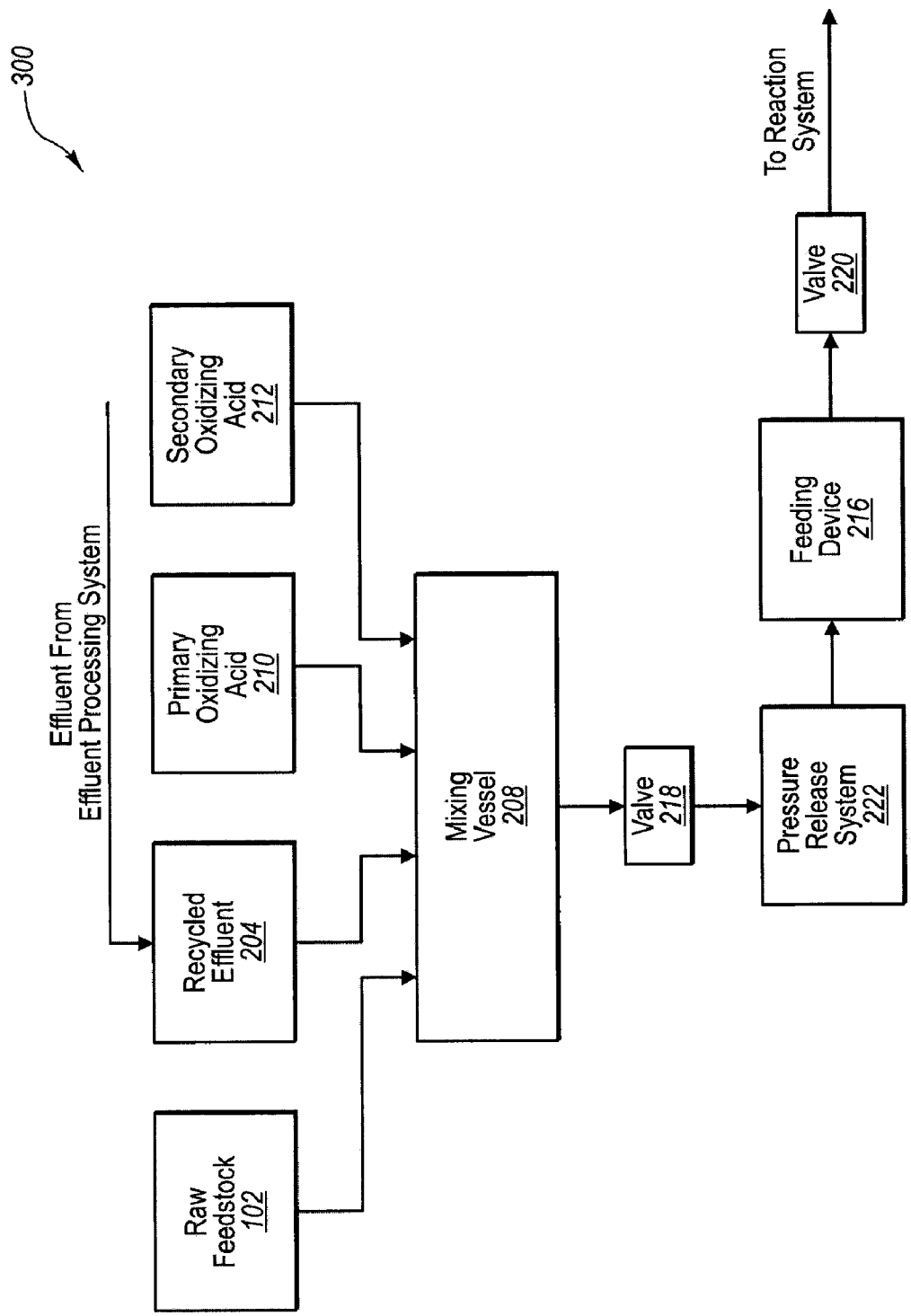
FIG. 3 is a block diagram of another embodiment of the feedstock processing system from FIG. 1.

It should be appreciated that the feedstock processing system 104 may be configured in a number of other ways besides what is shown in FIG. 2. For example, FIG. 3 shows a block diagram of another embodiment of a feedstock processing system 300. This embodiment is similar to the feedstock processing system 200 except that the raw feedstock does not enter a grinder before entering the mixing vessel 208. Also, the primary feedstock is not stored in a separate storage vessel.

The feedstock processing system 300 may be suitable for situations where the raw feedstock 102 does not need to be comminuted. For example, the raw feedstock 102 may already be uniform with small particles. Also, the mixing vessel 208 may function as a storage vessel so that the primary feedstock is drawn from the mixing vessel 208 into the reactor 402. Numerous other changes to the feedstock processing system 104 are also contemplated.

Figure 4:
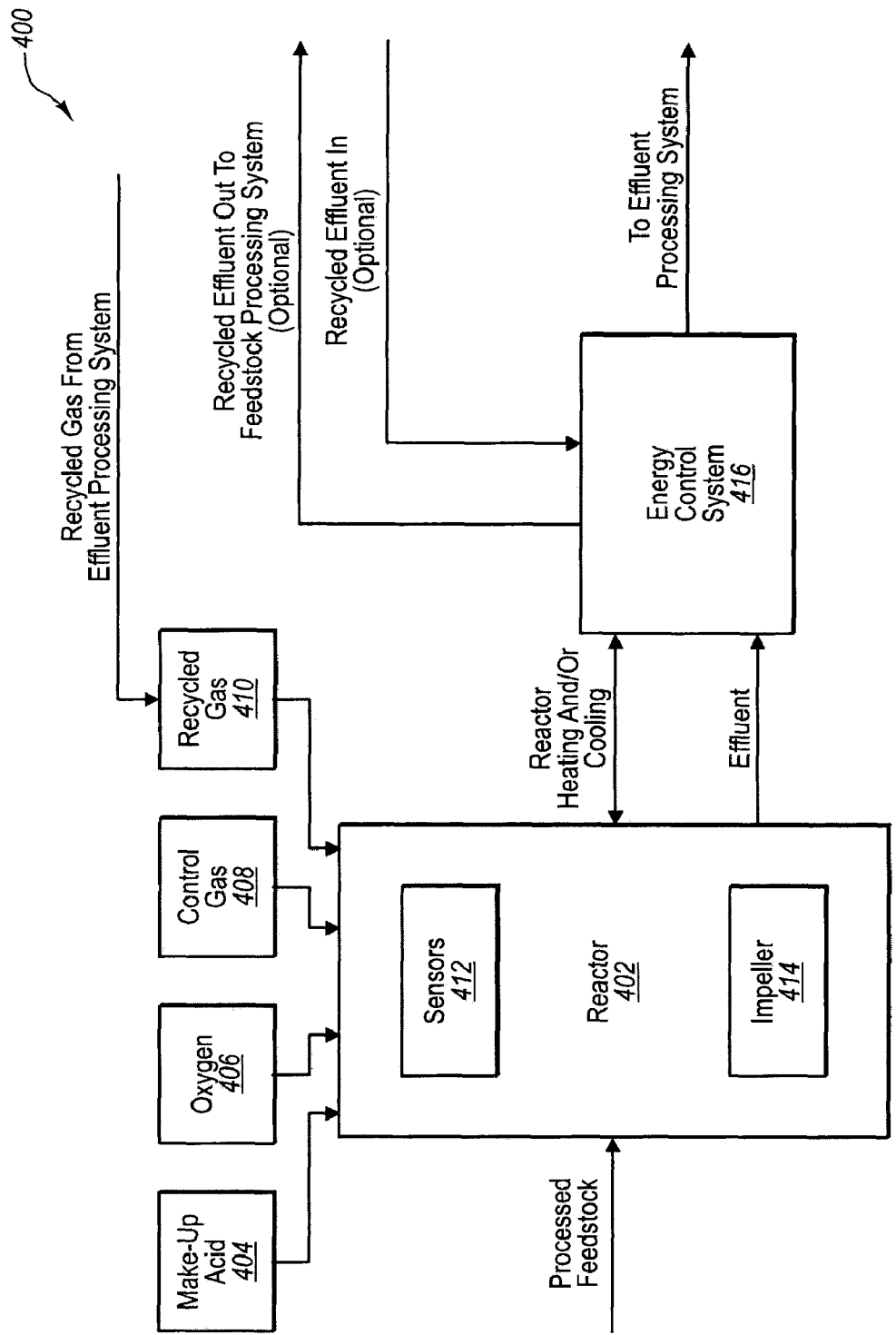
FIG. 4 is a block diagram of one embodiment of the reaction system from FIG. 1.

Referring to FIG. 4, a block diagram is shown of one embodiment of a reaction system 400. The reaction system 400 includes the reactor 402, which receives the processed feedstock from the feedstock processing system 104. The reactor 402 is in fluid communication with a make-up acid source 404, an oxygen gas source 406, a control gas source 408, and a recycled gas source 410. The reactor 402 includes one or more sensors 412 and an impeller or dispersion device 414. The temperature of the reactor 402 may be controlled by an energy control system 416.

At start-up, the reactor 402 is initially charged with an initial reaction mixture that includes an aqueous solution of the primary oxidizing acid and the secondary oxidizing acid. In one embodiment, the primary oxidizing acid is nitric acid and the secondary oxidizing acid is sulfuric acid. The reactor 402 may be initially charged with an aqueous mixture of nitric and sulfuric acid having any of the concentrations described above. For example, equal volumes of approximately 3.35 mol/L nitric acid and 0.4 mol/L sulfuric acid may be combined in the reactor 402 to form the initial reaction mixture.

The reactor 402 may be filled to any suitable level with the initial reaction mixture. In one embodiment, the initial reaction mixture occupies at least approximately 25% of the volume of the reactor 402 or, suitably, at least approximately 35% of the volume of the reactor. In another embodiment, the initial reaction mixture occupies no more than approximately 80% of the volume of the reactor 402 or, suitably, no more than approximately 70% of the volume of the reactor 402. In yet another embodiment, the initial reaction mixture occupies approximately 25% to 80% of the volume of the reactor 402 or, suitably, approximately 35% to 70% of the volume of the reactor 402. Preferably, the initial reaction mixture occupies approximately 50% of the volume of the reactor 402. In any of these embodiments, the remainder of the volume of the reactor 402, i.e., the headspace, is occupied by gases.

The headspace is initially charged with oxygen gas and/or one or more other gases, preferably inert gases. The oxygen gas is used to regenerate the nitric acid in the reaction mixture as described in greater detail below. The oxygen gas 406 may be supplied from any suitable source. For example, the oxygen source may be air, pure oxygen, or even a product of another reaction.

In one embodiment, the gas in the headspace at start-up includes at least approximately 2 volume percent oxygen gas, desirably, at least approximately 5 volume percent, or, suitably, at least approximately 8 volume percent. In another embodiment, the gas in the headspace at start-up includes no more than approximately 60 volume percent oxygen gas, desirably, no more than approximately 45 volume percent oxygen gas, or, suitably, no more than approximately 35 volume percent oxygen gas. In yet another embodiment, the gas in the headspace at start-up includes approximately 2 to 60 volume percent oxygen gas, desirably, 5 to 45 volume percent oxygen gas, or, suitably, 8 to 35 volume percent oxygen gas.

The headspace may also be charged with other gases that are inert or otherwise unable to adversely affect the redox reaction. Suitable gases include nitrogen, argon, and the like. These gases are supplied as the control gas 408 in FIG. 4.

At start-up, the temperature and pressure are increased together until operating conditions are reached. For example, when the temperature reaches 60° C., the pressure is increased (by adding gas to the headspace) to approximately 1035 kPa. At 150° C., the pressure is increased to approximately 2070 kPa. Once the mixture reaches operating temperature, the pressure is increased to approximately 3450 kPa. It should be appreciated, that the temperature and pressure may fluctuate substantially from the initial levels during processing.

The initial reaction mixture is heated by the energy control system to at least 150° C. as the impeller 414 vigorously mixes or agitates the reaction mixture. The reactor 402 may be heated using a heat exchanger in the energy control system 416 that is in fluid communication with a heating jacket on the outside of the reactor 402. It should be appreciated that in most situations the reactor 402 only needs to be heated at start-up. Once the redox reaction begins, it is sufficiently exothermic that it is unnecessary to continue heating the reactor 402 during operation. Instead, the reactor 402 may include an internal cooling coil that is used to maintain the temperature of the reaction mixture below a maximum threshold. It should be appreciated that the same coil may be used to heat and cool the reactor 402, if desired.

It should be appreciated that the energy control system 416 can be viewed as a collection of any number, type, or configuration of heat exchangers, heat sources, heat sinks and other energy transfer devices and components that can be used to add and/or extract heat from various streams, reactors, etc. For example, the energy control system 416 may include a supplemental heat source that is used to supply and/or remove heat from the heat exchanger using one or more heat exchange coils. Numerous other examples are also contemplated.

The impeller 414 is used to thoroughly and vigorously mix the reaction mixture and disperse the gas from the headspace into the reaction mixture. The impeller 414 may have any suitable design or configuration so long as it is capable of adequately doing these things. In one embodiment, the impeller may be a gas entrainment impeller. The gas is dispersed by impeller blades attached to a hollow shaft through which gases are continuously recirculated from the headspace of the reactor 402. The gas enters openings near the top of the shaft and is expelled through dispersion ports located at the tips of the impeller blades. The high speed rotation of the impeller blades creates a low pressure area at the tip. The pressure at the tip of the blades drops as the speed of the impeller 414 increases, thereby increasing the rate at which gas is dispersed from the headspace through the reaction mixture.

The reactor 402 may also include one or more baffles that enhance dispersion of the headspace gas as well as the general stirring of the reaction mixture. The transfer of gas is governed by the relative speed of the tips of the impeller 414 to the liquid phase, which reduces the pressure at the tips (i.e., creates a vacuum) of the impeller 414 and thereby draws gas into the reaction mixture. A baffle may be used to impede rotation of the liquid reaction mixture relative to the impeller 414. This may enhance the operation of the impeller 414. A baffle designed specifically for this purpose may be placed in the reactor 402. Alternatively, the cooling coil and/or other structures that are integral or added to the reactor 402 may function as a baffle. In one embodiment, the cooling coil may have a serpentine shape.

The sensors 412 may measure one or more of the following parameters: temperature, pressure, or liquid level. The sensors 412 may be used to implement an automated control system or simply provide the operator with information about the status of the reactor 402. The reactor 402 may have an emergency blowdown system as well as a gas out port.

The emergency blowdown system includes a large-diameter, high pressure pipe that runs from the reactor 402 to an emergency blowdown containment vessel. In the event of an emergency overheat/overpressure situation, the pipe will quickly empty the reactor 402 into the emergency blowdown containment vessel. The vessel will receive all the contents of the reactor 402 without leaking anything to the surrounding environment.

The gas out port is not ordinarily used to remove the gas from the reactor 402. Instead, the gas is primarily removed in the reactor effluent. The reactor 402 may be any suitable size that is capable of accommodating the desired throughput.

Once the reactor 402 reaches its start-up parameters, it is ready to begin receiving and oxidizing the primary feedstock. Shortly after the primary feedstock enters the reactor 402, the redox reaction reaches a steady operating state. At this point, the reaction mixture includes the primary feedstock, the initial start-up oxidizing acids, water, dissolved and undissolved gases as well as various reaction products. The redox reaction can be indefinitely sustained at a steady state. Although conditions in the reactor 402 may vary significantly over time, they do not vary so much that the reaction is adversely affected.

In some respects, the start-up parameters of the reactor 402, such as the oxygen gas concentration in the headspace and the volume occupied by the reaction mixture, are maintained during operation. For example, the oxygen gas concentrations are maintained at the levels described above during operation. Also, the reaction mixture may occupy the same volume of the reactor 402 as the initial reaction mixture. Thus, the volume amounts described above in connection with the initial reaction mixture apply equally to the reaction mixture during operation.

The pressure in the reactor 402 is maintained at a level that is sufficient to keep the reaction products of nitric acid in solution so that they can react with the oxygen to regenerate the nitric acid. In one embodiment, the pressure in the reactor 402 is maintained at at least approximately 2070 kPa, desirably, at least approximately 2410 kPa, or, suitably, at least approximately 2800 kPa. In another embodiment, the pressure in the reactor 402 is maintained at no more than approximately 6900 kPa, desirably, no more than approximately 6200 kPa, or, suitably, no more than approximately 5515 kPa. In yet another embodiment, the pressure in the reactor 402 is maintained at approximately 2070 kPa to 6900 kPa, desirably, approximately 2410 kPa to 6200 kPa, or, suitably, approximately 2800 kPa to 5515 kPa.

The pressure in the reactor 402 may be maintained by selectively adding the oxygen gas 406, the control gas 408, or the recycled gas 410. If the concentration of oxygen gas 406 is low, then oxygen gas 406 is added to increase the pressure. However, if additional oxygen gas 406 is not needed, then either the control gas 408 or the recycled gas 410 are added to increase the pressure. It should be understood that the redox reaction generates gas that also contributes to the pressure inside the reactor 402. Due to the high operating pressure of the reactor 402, the oxygen gas 406, the control gas 408, and/or the recycled gas 410 may be supplied at pressures greater than 6900 kPa so that they will flow into the reactor 402.

The temperature of the reaction mixture is maintained at a level that prevents the nitric acid from decomposing, but encourages the rapid oxidation of the feedstock. The temperature is controlled with the energy control system 416 as described above. In one embodiment, the temperature of the reaction mixture is maintained at no more than 210° C. or, desirably, no more than 205° C. In another embodiment, the temperature of the reaction mixture is maintained at at least approximately 150° C. or, desirably, approximately 160° C. In yet another embodiment, the temperature of the reaction mixture is maintained at approximately 150° C. to 210° C., or, desirably, approximately 160° C. to 205° C.

During operation, the impeller 414 is configured to disperse a sufficient amount of the oxygen gas from the headspace into the reaction mixture to regenerate the nitric acid. The oxygen reacts with the nitric acid reduction products to form nitric acid without any processing outside of the reactor. The amount of the nitric acid that is regenerated can vary. In one embodiment, at least a majority of the nitric acid is regenerated, desirably, at least 75% of the nitric acid is regenerated, or, suitably at least 90% of the nitric acid is regenerated.

The impeller 414 circulates the gas from the headspace through the reaction mixture so that the concentration of the gases in the reaction mixture is very similar, if not the same, as the concentration of the gases that are dissolved or undissolved in the reaction mixture. The advantage of this is that the amount of oxygen gas supplied to the reaction mixture can be closely controlled based on oxygen gas measurements taken in the headspace. In one embodiment, concentration of dissolved and undissolved oxygen gas in the gaseous portion of the reaction mixture is within approximately 25% of the concentration of oxygen gas in the headspace, desirably, within approximately 10% of the concentration of oxygen gas in the headspace, or, suitably, within approximately 5% of the concentration of oxygen gas in the headspace.

The composition of the gas in the headspace may be adjusted to control the reaction products produced by the redox reaction. Preferably, the desired reaction products are maximized when the composition of gases inside the reactor meet the following parameters: oxygen has the concentration given above, carbon dioxide 5%-25% by volume; carbon monoxide 2%-10% by volume; nitrous oxide ($N_2O$) 2%-5% by volume with the remainder being Argon and/or Nitrogen as well as minor amounts of $NO_x$ and $SO_x$ as trace impurities.

The concentration of the oxidizing acids in the reaction mixture may be the same or similar to the concentration at start-up. Additional acid is added from the make-up acid source 404 as needed.

Inside the reactor 402, the feedstock undergoes a complex, exothermic, redox process. The nitrogen compounds in the reaction mixture are altered so that the nitrogen compounds are reduced to gaseous nitrogen and/or nitrous oxide ($N_2O$). Except those already listed, no compounds of the $NO_x$ type are produced in the reaction mixture at more than trace levels. A portion of the nitrogen compounds in the reaction mixture is incorporated into the complex hydrocarbons noted below.

A substantial portion of the carbon in the feedstock is oxidized to carbon dioxide and/or carbon monoxide. That portion of the carbon in the feedstock that is not oxidized to either carbon dioxide or carbon monoxide is incorporated into heavier hydrocarbon molecules. In situations where the oxidation potential was held to a sustained low level, a portion of the carbon in the feedstock was reduced to furanones, and furandiones, as well as other complex hydrocarbons such as paraffins.

The hydrogen in the reaction mixture is oxidized primarily to water. However, in certain conditions, the hydrogen may be incorporated into complex hydrocarbons such as organic hydrofluorides of the type amine-dihydrofluoride. Other minor/trace components such as phosphorous, potassium, ammonia, iron, and the like, form sulfates, nitrates, as well as other, more complex, salts.

A reactor effluent may be continually extracted from the reactor 402. The reactor effluent primarily includes salty, acidic water (and in some embodiments, minor levels of complex hydrocarbons as noted above) since that is all that is left when the reaction is complete. In one embodiment, most, if not all, of the gas that is removed from the reactor 402 exits with the reactor effluent. The gas that exits with the effluent is the dissolved and undissolved gas in the reaction mixture—i.e., the gaseous portion of the reaction mixture.

In one embodiment, at least approximately 94 wt. % of the reaction mixture that exits the reactor 402 does so in the reactor effluent, and at least approximately 94 wt. % of the gas that exits the reactor does so in the reactor effluent. In another embodiment, at least approximately 98 wt. % of the reaction mixture that exits the reactor 402 does so in the reactor effluent, and at least approximately 98 wt. % of the gas that exits the reactor does so in the reactor effluent. In yet another embodiment, at least substantially all of the reaction mixture that exits the reactor 402 does so in the reactor effluent, and at least approximately substantially all of the gas that exits the reactor does so in the reactor effluent.

Upon exiting the reactor 402, the effluent may enter the energy control system 416. The energy control system 416 serves two primary functions: to extract energy from the process and to maintain the operating temperature of the reactor 402. Energy can be extracted by allowing the effluent to flow to a slightly reduced pressure heat exchanger which transfers energy to harness it for productive ends. The second function is accomplished as described above.

It should be noted that any unspent nitric acid in the reactor effluent may be removed by flashing it off before it is cooled below the boiling point of nitric acid. Also, any excess water may be flashed off in the energy control system. The need to flash or otherwise separate water from the effluent may be reduced by restricting the amount of water that is added to the feedstock.

Figure 5:
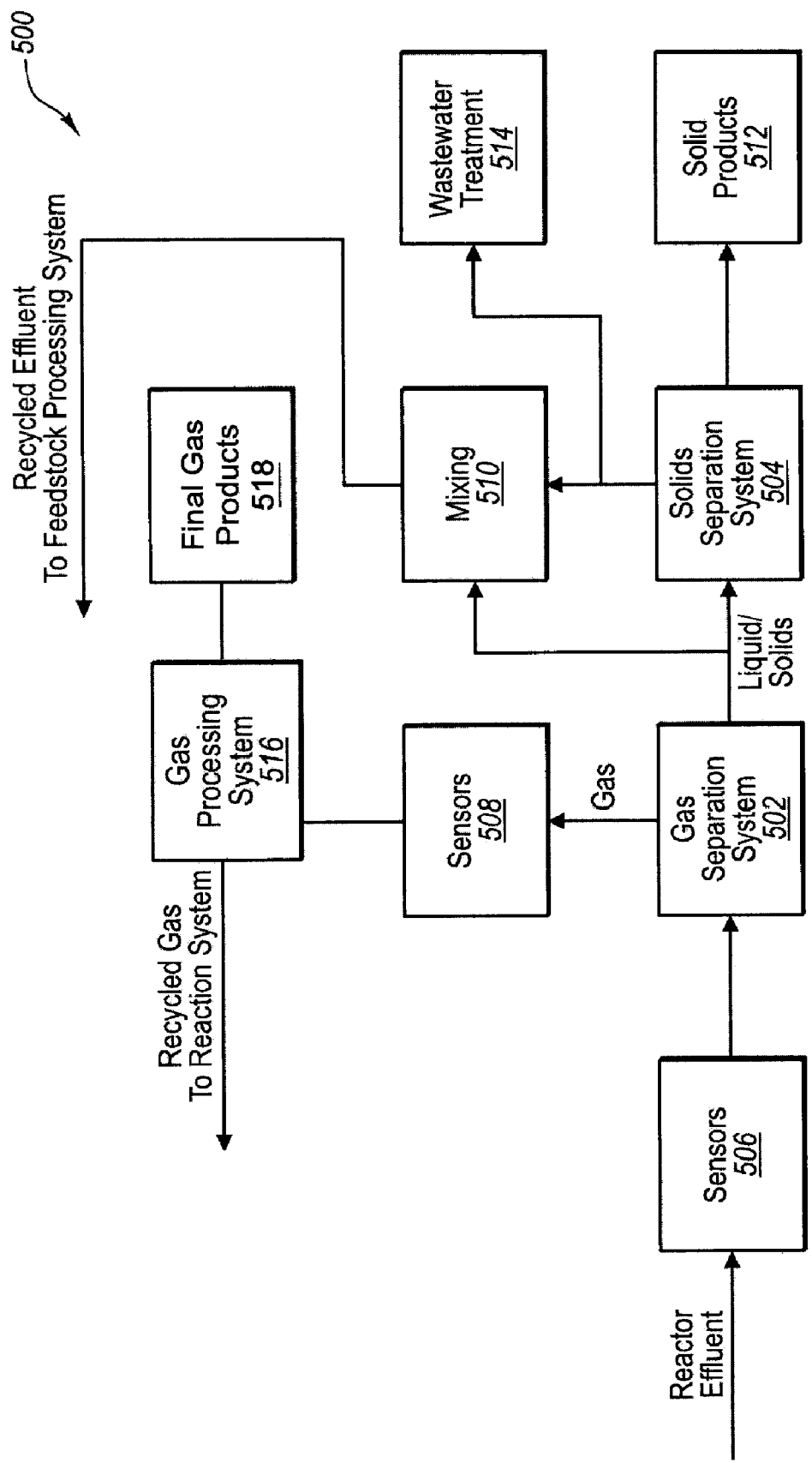
FIG. 5 is a block diagram of one embodiment of the effluent processing system from FIG. 1.

Turning to FIG. 5, a block diagram of one embodiment of an effluent processing system 500 is shown. The effluent processing system 500 receives the effluent after it exits the energy control system 416. A number of sensors 506 are used to measure parameters such as pH and conductivity of the cooled effluent. This information may be used to control the amount of the acids 210, 212 that are added to the mixing vessel 208. For example, the lower the pH of the effluent, the less acid that needs to be added to the mixing vessel 208.

The cooled effluent flows to the gas separation system 502 where the pressure is allowed to drop to ambient inside the separation equipment. At this point, the effluent is vigorously agitated to drive off the dissolved and undissolved gases. From the gas separation system 502, the liquid/solids stream is split with a portion of the stream going to a mixing area 510 and a portion going to the solids separation system 504. From solids separation system 504, the stream is split with part going to the mixing area 510 and the remainder going to the waste water treatment 514. From the mixing area 510, the effluent is recycled back to the feedstock processing system 104. As shown in FIG. 4, the recycled effluent may be heated in the energy control system 416 before it reaches the feedstock processing system 104. The solids recovered from the solids separation system 504 are sent to post processing for refining into final solid products, which can are then stored, packaged, shipped and/or disposed.

The gases move from the gas separation system 502 through sensors 508 and on to either be recycled back to the reactor 402 or to the gas processing system 516. The different gases are separated in the gas processing system 516. From the gas processing system 516, the oxygen, plus the amounts of argon/nitrogen needed for the reactor 402 are pumped into a pressured holding tank. At the gas processing system, the gases not required for the reactor 402 are processed and moved to the final gas products 518 for storing, packaging, shipping and/or disposal.

Illustrative Embodiments

Reference is made in the following to a number of illustrative embodiments of the subject matter described herein. The following embodiments illustrate only a few selected embodiments that may include the various features, characteristics, and advantages of the subject matter as presently described. Accordingly, the following embodiments should not be considered as being comprehensive of all of the possible embodiments. Also, features and characteristics of one embodiment may and should be interpreted to equally apply to other embodiments or be used in combination with any number of other features from the various embodiments to provide further additional embodiments, which may describe subject matter having a scope that varies (e.g., broader, etc.) from the particular embodiments explained below. Accordingly, any combination of any of the subject matter described herein is contemplated.

According to one embodiment, a method comprises: combining an initial feedstock and effluent from a reactor to form a primary feedstock; and oxidizing the primary feedstock in the reactor, the primary feedstock being part of a reaction mixture that also includes nitric acid and a secondary oxidizing acid. The method may comprise comminuting the primary feedstock. The method may comprise combining the initial feedstock, the effluent, and an oxidizing acid to form the primary feedstock. The method may comprise combining the initial feedstock, the effluent, nitric acid, and the secondary oxidizing acid to form the primary feedstock, and wherein the concentration of nitric acid and the secondary oxidizing acid in the primary feedstock, excluding solids, may be approximately the same as the concentration of the nitric acid and the secondary oxidizing acid, respectively, in the reactor at start-up. The primary feedstock may include particles where the largest dimension of at least approximately 95% of the particles in the primary feedstock is no more than 4 mm. The effluent may be at a temperature that is elevated relative to the ambient temperature. The effluent may be acidic.

According to another embodiment, a method comprises: combining an initial feedstock and effluent from a reactor to form a primary feedstock; oxidizing the primary feedstock in the reactor, the primary feedstock being part of a reaction mixture that also includes nitric acid and oxygen gas; supplying the oxygen gas to the reaction mixture in an amount that is sufficient to regenerate at least a majority of the nitric acid; and maintaining the reaction mixture at a temperature that is no more than approximately 210° C. The method may comprise comminuting the primary feedstock. The method may comprise combining the initial feedstock, the effluent, and an oxidizing acid to form the primary feedstock. The method may comprise combining the initial feedstock, the effluent, nitric acid, and a secondary oxidizing acid to form the primary feedstock, and wherein the concentration of nitric acid and the secondary oxidizing acid in the primary feedstock, excluding solids, may be approximately the same as the concentration of the nitric acid and the secondary oxidizing acid, respectively, in the reactor at start-up. The primary feedstock may includes particles where the largest dimension of at least approximately 95% of the particles in the primary feedstock is no more than 4 mm. The effluent may be at a temperature that is elevated relative to the ambient temperature.

According to another embodiment, a method comprises: combining an initial feedstock and an oxidizing acid to form a primary feedstock; oxidizing the primary feedstock in a reactor, the primary feedstock being part of a reaction mixture that also includes nitric acid and oxygen gas; supplying the oxygen gas to the reaction mixture in an amount that is sufficient to regenerate at least a majority of the nitric acid; and maintaining the reaction mixture at a temperature that is no more than approximately 210° C. The method may comprise comminuting the primary feedstock. The oxidizing acid may be a primary oxidizing acid, and the method may comprise combining the initial feedstock, the primary oxidizing acid, and a secondary oxidizing acid to form the primary feedstock. The concentration of the primary oxidizing acid and the secondary oxidizing acid in the primary feedstock, excluding solids, may be approximately the same as the concentration of the nitric acid and the secondary oxidizing acid, respectively, in the reactor at start-up. The primary feedstock may include particles where the largest dimension of at least approximately 95% of the particles in the primary feedstock is no more than 4 mm. The oxidizing acid may include nitric acid.

According to another embodiment, a method comprises: combining an initial feedstock and effluent from a reactor to form a primary feedstock; oxidizing the primary feedstock in the reactor, the primary feedstock being part of a reaction mixture that also includes nitric acid; and maintaining a pressure in the reactor of at least approximately 2070 kPa. The method may comprise comminuting the primary feedstock. The method may comprise combining the initial feedstock, the effluent, and an oxidizing acid to form the primary feedstock. The method may comprise combining the initial feedstock, the effluent, nitric acid, and a secondary oxidizing acid to form the primary feedstock, and wherein the concentration of nitric acid and the secondary oxidizing acid in the primary feedstock, excluding solids, may be approximately the same as the concentration of the nitric acid and the secondary oxidizing acid, respectively, in the reactor at start-up. The primary feedstock may include particles where the largest dimension of at least approximately 95% of the particles in the primary feedstock is no more than 4 mm. The pressure in the reactor may be at least 2800 kPa.

According to another embodiment, a method comprises: combining an initial feedstock and an oxidizing acid to form a primary feedstock; and oxidizing the primary feedstock in a reactor, the primary feedstock being part of a reaction mixture that also includes nitric acid and a secondary oxidizing acid.

According to another embodiment, a method comprises: combining an initial feedstock and an oxidizing acid to form a primary feedstock; oxidizing the primary feedstock in a reactor, the primary feedstock being part of a reaction mixture that also includes nitric acid; and maintaining a pressure in the reactor of at least approximately 2070 kPa.

According to another embodiment, a method comprises: combining an initial feedstock and effluent from a reactor to form a primary feedstock; oxidizing the primary feedstock in the reactor, the primary feedstock being part of a reaction mixture that also includes nitric acid, a secondary oxidizing acid, and oxygen gas; supplying the oxygen gas to the reaction mixture in an amount that is sufficient to regenerate at least a majority of the nitric acid; maintaining the reaction mixture at a temperature that is no more than approximately 210° C.; and maintaining a pressure in the reactor of at least approximately 2070 kPa.

According to another embodiment, a method comprises: combining an initial feedstock and an oxidizing acid to form a primary feedstock; oxidizing the primary feedstock in a reactor, the primary feedstock being part of a reaction mixture that also includes nitric acid, a secondary oxidizing acid, and oxygen gas; supplying the oxygen gas to the reaction mixture in an amount that is sufficient to regenerate at least a majority of the nitric acid; maintaining the reaction mixture at a temperature that is no more than approximately 210° C.; and maintaining a pressure in the reactor of at least approximately 2070 kPa.

According to another embodiment, a method comprises: comminuting an initial feedstock to form a primary feedstock that includes particles where the largest dimension of at least approximately 95% of the particles in the primary feedstock is no more than 7 mm; oxidizing the primary feedstock in a reactor, the primary feedstock being part of a reaction mixture that also includes nitric acid and a secondary oxidizing acid. The method may comprise feeding the primary feedstock into the reactor at a feed rate that is approximately constant. The method may comprises combining an oxidizing acid with the initial feedstock and/or the primary feedstock before the primary feedstock enters the reactor. The method may comprise combining effluent from the reactor with the initial feedstock and/or the primary feedstock before the primary feedstock enters the reactor. The initial feedstock may include effluent from the reactor. The largest dimension of at least approximately 95% of the particles in the primary feedstock may be no more than 4 mm. The largest dimension of at least approximately 95% of the particles in the primary feedstock may be no more than 2.5 mm. The largest dimension of at least approximately 95% of the particles in the primary feedstock may be no more than 1.5 mm. The largest dimension of at least approximately 95% of the particles in the primary feedstock may be no more than 0.5 mm.

According to another embodiment, a method comprises: comminuting an initial feedstock to form a primary feedstock that includes particles where the largest dimension of at least approximately 95% of the particles in the primary feedstock is no more than 7 mm; oxidizing the primary feedstock in a reactor, the primary feedstock being part of a reaction mixture that also includes nitric acid and oxygen gas; supplying the oxygen gas to the reaction mixture in an amount that is sufficient to regenerate at least a majority of the nitric acid; and maintaining the reaction mixture at a temperature that is no more than approximately 210° C. The method may comprise combining nitric acid with the initial feedstock and/or the primary feedstock before the primary feedstock enters the reactor. The method may comprise combining effluent from the reactor with the initial feedstock and/or the primary feedstock before the primary feedstock enters the reactor. The initial feedstock may include effluent from the reactor. The reaction mixture may include a secondary oxidizing acid. The largest dimension of at least approximately 95% of the particles in the primary feedstock may be no more than 2.5 mm.

According to another embodiment, a method comprises: comminuting an initial feedstock to form a primary feedstock that includes particles where the largest dimension of at least approximately 95% of the particles in the primary feedstock is no more than 7 mm; oxidizing the primary feedstock in a reactor, the primary feedstock being part of a reaction mixture that also includes nitric acid; and maintaining a pressure in the reactor of at least approximately 2070 kPa. The method may comprise combining nitric acid and a secondary oxidizing acid with the initial feedstock and/or the primary feedstock before the primary feedstock enters the reactor. The method may comprise combining effluent from the reactor with the initial feedstock and/or the primary feedstock before the primary feedstock enters the reactor. The initial feedstock may include effluent from the reactor. The largest dimension of at least approximately 95% of the particles in the primary feedstock may be no more than 2.5 mm. The pressure in the reactor may be at least 2800 kPa.

According to another embodiment, a method comprises: comminuting an initial feedstock to form a primary feedstock that includes particles where the largest dimension of at least approximately 95% of the particles in the primary feedstock is no more than 7 mm; feeding the primary feedstock into a reactor at an approximately constant feed rate; oxidizing the primary feedstock in the reactor, the primary feedstock being part of a reaction mixture that also includes nitric acid, a secondary oxidizing acid, and oxygen gas; supplying the oxygen gas to the reaction mixture in an amount that is sufficient to regenerate at least a majority of the nitric acid; maintaining the reaction mixture at a temperature that is no more than approximately 210° C.; and maintaining a pressure in the reactor of at least approximately 2070 kPa. The largest dimension of at least approximately 95% of the particles in the primary feedstock may be no more than 2.5 mm. The initial feedstock may include effluent from the reactor. The may comprise combining nitric acid and the secondary oxidizing acid with the initial feedstock and/or the primary feedstock before the primary feedstock enters the reactor. The method may comprise: combining effluent from the reactor with the initial feedstock to form an intermediate feedstock; comminuting the intermediate feedstock to form a comminuted feedstock; and combining the comminuted feedstock, nitric acid, and the secondary oxidizing acid to form the primary feedstock.

According to another embodiment, a method comprises: feeding a feedstock into a reactor at a feed rate that is approximately constant; oxidizing the feedstock in the reactor, the feedstock being part of a reaction mixture that also includes nitric acid and a secondary oxidizing acid; and maintaining a pressure in the reactor of at least approximately 2070 kPa; wherein the feed rate is approximately constant even though the pressure in the reactor may vary from approximately 2070 kPa to 6,900 kPa. The feedstock may be a slurry. The slurry may include nitric acid and/or the secondary oxidizing acid. The method may comprise a plurality of feeding devices that are sequentially activated and refilled to feed the feedstock into the reactor. The feedstock may include particles where the largest dimension of at least approximately 95% of the particles in the feedstock is no more than 4 mm. The feedstock may be fed into the reactor with a feeding device that is hydraulically powered. The feedstock may be fed into the reactor with a feeding device that is powered by a gearmotor.

According to another embodiment, a method comprises: feeding a feedstock into a reactor with a feeding device that is powered hydraulicly or by a gearmotor; and oxidizing the feedstock in the reactor, the feedstock being part of a reaction mixture that also includes nitric acid and a secondary oxidizing acid. The method may comprise maintaining a pressure in the reactor of at least approximately 2070 kPa. The feedstock may include particles where the largest dimension of at least approximately 95% of the particles in the feedstock is no more than 4 mm. The method may comprise a plurality of the feeding devices that are sequentially activated and refilled to feed the feedstock into the reactor. The feedstock may include effluent from the reactor and/or an oxidizing acid.

According to another embodiment, a method comprises: feeding a first amount of a feedstock into a pressurized reactor with a feeding device; isolating the feeding device from the pressurized reactor; filling the feeding device with a second amount of the feedstock; feeding the second amount of the feedstock into the pressurized reactor with the feeding device; oxidizing the feedstock in the pressurized reactor, the feedstock being part of a reaction mixture that also includes nitric acid and a secondary oxidizing acid; and maintaining a pressure in the reactor of at least approximately 2070 kPa. The method may comprise a valve that isolates the feeding device from the pressurized reactor. The first amount of the feedstock and the second amount of the feedstock may be fed into the pressurized reactor at a feed rate that is approximately constant. Filling the feeding device with the second amount of the feedstock may be done at a pressure that is greatly reduced from the pressure of the pressurized reactor. The pressure in the reactor may be at least 2800 kPa.

According to another embodiment, a method comprises: feeding a feedstock into a reactor at a feed rate that is approximately constant; oxidizing the feedstock in the reactor, the feedstock being part of a reaction mixture that also includes nitric acid, a secondary oxidizing acid, and oxygen gas; supplying the oxygen gas to the reaction mixture in an amount that is sufficient to regenerate at least a majority of the nitric acid; maintaining the reaction mixture at a temperature that is no more than approximately 210° C.; and maintaining a pressure in the reactor of at least approximately 2070 kPa; wherein the feed rate is approximately constant even though the pressure in the reactor may vary from approximately 2070 kPa to 6,900 kPa. The feedstock may include particles where the largest dimension of at least approximately 95% of the particles in the feedstock is no more than 4 mm. The method may comprise a plurality of feeding devices that are sequentially activated and refilled to feed the feedstock into the reactor. The feedstock may include effluent from the reactor and/or an oxidizing acid.

According to another embodiment, a method comprises: feeding a feedstock into a reactor at a feed rate that fluctuates no more than approximately 10% per hour; oxidizing the feedstock in a reactor, the feedstock being part of a reaction mixture that also includes nitric acid; and maintaining a pressure in the reactor of at least approximately 2070 kPa; wherein the feed rate fluctuates no more than approximately 10% per hour even though the pressure in the reactor may vary from approximately 2070 kPa to 6,900 kPa.

According to another embodiment, a method comprises: feeding a feedstock into a reactor with a feeding device that is powered hydraulicly or by a gearmotor; oxidizing the feedstock in the reactor, the feedstock being part of a reaction mixture that also includes nitric acid and oxygen gas; supplying the oxygen gas to the reaction mixture in an amount that is sufficient to regenerate at least a majority of the nitric acid; and maintaining the reaction mixture at a temperature that is no more than approximately 210° C.

According to another embodiment, a method comprises: feeding a feedstock into a reactor with a feeding device that is powered hydraulicly or by a gearmotor; oxidizing the feedstock in the reactor, the feedstock being part of a reaction mixture that also includes nitric acid; and maintaining a pressure in the reactor of at least approximately 2070 kPa.

According to another embodiment, a method comprises: feeding a feedstock into a reactor with a feeding device that is powered hydraulicly or by a gearmotor; oxidizing the feedstock in the reactor, the feedstock being part of a reaction mixture that also includes nitric acid, a secondary oxidizing acid, and oxygen gas; supplying the oxygen gas to the reaction mixture in an amount that is sufficient to regenerate at least a majority of the nitric acid; maintaining the reaction mixture at a temperature that is no more than approximately 210° C.; and maintaining a pressure in the reactor of at least approximately 2070 kPa.

According to another embodiment, a method comprises: feeding a first amount of a feedstock into a pressurized reactor with a feeding device; isolating the feeding device from the pressurized reactor; filling the feeding device with a second amount of the feedstock; feeding the second amount of the feedstock into the pressurized reactor with the feeding device; oxidizing the feedstock in the pressurized reactor, the feedstock being part of a reaction mixture that also includes nitric acid; and maintaining a pressure in the pressurized reactor of at least approximately 2070 kPa; wherein the first amount of the feedstock and the second amount of the feedstock are fed into the pressurized reactor at a feed rate that fluctuates no more than approximately 10% per hour;

According to another embodiment, a method comprises: feeding a first amount of a feedstock into a pressurized reactor with a feeding device; isolating the feeding device from the pressurized reactor; filling the feeding device with a second amount of the feedstock; feeding the second amount of the feedstock into the pressurized reactor with the feeding device; oxidizing the feedstock in the pressurized reactor, the feedstock being part of a reaction mixture that also includes nitric acid, a secondary oxidizing acid, and oxygen gas; supplying the oxygen gas to the reaction mixture in an amount that is sufficient to regenerate at least a majority of the nitric acid; maintaining the reaction mixture at a temperature that is no more than approximately 210° C.; and maintaining a pressure in the reactor of at least approximately 2070 kPa; wherein the first amount of the feedstock and the second amount of the feedstock are fed into the pressurized reactor at a feed rate that is approximately constant;

According to another embodiment, a method comprises: oxidizing a feedstock in a reactor, the feedstock being part of a reaction mixture that also includes nitric acid and a secondary oxidizing acid; and dispersing gas from a headspace of the reactor into the reaction mixture. The method may comprise dispersing the gas from the headspace into the reaction mixture with an impeller that is hollow and causes gas from the headspace to flow through the impeller into the reaction mixture. The method may comprise dispersing the gas from the headspace into the reaction mixture with a gas entrainment impeller. The method may comprise supplying oxygen gas to the reactor and dispersing the oxygen gas from the headspace of the reactor into the reaction mixture. The method may comprise a baffle positioned in the reaction mixture to enhance the dispersion of the gas from the headspace into the reaction mixture. The method may comprise maintaining a pressure in the reactor of at least approximately 2070 kPa. The gas in the headspace may include 2 to 60 volume percent oxygen gas.

According to another embodiment, a method comprises: oxidizing a feedstock in a reactor, the feedstock being part of a reaction mixture that also includes nitric acid and oxygen gas; supplying the oxygen gas to the reactor; dispersing the oxygen gas from a headspace of the reactor into the reaction mixture in a manner that is sufficient to regenerate at least a majority of the nitric acid; and maintaining the reaction mixture at a temperature that is no more than approximately 210° C. The gas in the headspace may include 2 to 60 volume percent oxygen gas. The method may comprise dispersing the gas from the headspace into the reaction mixture with an impeller that is hollow and causes gas from the headspace to flow through the impeller into the reaction mixture. The method may comprise dispersing the gas from the headspace into the reaction mixture with a gas entrainment impeller. The method may comprise maintaining a pressure in the reactor of at least approximately 2070 kPa.

According to another embodiment, a method comprises: oxidizing a feedstock in a reactor, the feedstock being part of a reaction mixture that also includes nitric acid and a secondary oxidizing acid; and maintaining the concentration of dissolved and undissolved oxygen gas in the gaseous portion of the reaction mixture within approximately 25% of the concentration of oxygen gas in a headspace of the reactor. The method may comprise maintaining the concentration of dissolved and undissolved oxygen gas in the gaseous portion of the reaction mixture within approximately 10% of the concentration of oxygen gas in the headspace of the reactor. The method may comprise maintaining the concentration of dissolved and undissolved oxygen gas in the gaseous portion of the reaction mixture within approximately 5% of the concentration of oxygen gas in the headspace of the reactor. The method may comprise dispersing the oxygen gas from the headspace into the reaction mixture with a gas entrainment impeller. The headspace may include 2 to 60 volume percent oxygen gas. The headspace may include 5 to 45 volume percent oxygen gas.

According to another embodiment, a method comprises: oxidizing a feedstock in a reactor, the feedstock being part of a reaction mixture that also includes nitric acid, a secondary oxidizing acid, and oxygen gas; supplying oxygen gas to the reactor; dispersing oxygen gas from a headspace of the reactor into the reaction mixture in a manner that is sufficient to regenerate at least a majority of the nitric acid; maintaining the reaction mixture at a temperature that is no more than approximately 210° C.; and maintaining a pressure in the reactor of at least approximately 2070 kPa. The method may comprise maintaining the concentration of dissolved and undissolved oxygen gas in the gaseous portion of the reaction mixture within approximately 10% of the concentration of oxygen gas in the headspace of the reactor. The method may comprise dispersing the oxygen gas from the headspace into the reaction mixture with an impeller that is hollow and causes the oxygen gas from the headspace to flow through the impeller into the reaction mixture. The method may comprise dispersing the oxygen gas from the headspace into the reaction mixture with a gas entrainment impeller.

According to another embodiment, a method comprises: oxidizing a feedstock in a reactor, the feedstock being part of a reaction mixture that also includes nitric acid; dispersing gas from a headspace of the reactor into the reaction mixture; and maintaining a pressure in the reactor of at least approximately 2070 kPa.

According to another embodiment, a method comprises: oxidizing a feedstock in a reactor, the feedstock being part of a reaction mixture that also includes nitric acid and oxygen gas; supplying the oxygen gas to the reactor mixture in an amount that is sufficient to regenerate at least a majority of the nitric acid; maintaining the concentration of dissolved and undissolved oxygen gas in the gaseous portion of the reaction mixture within approximately 25% of the concentration of oxygen gas in a headspace of the reactor; and maintaining the reaction mixture at a temperature that is no more than approximately 210° C.

According to another embodiment, a method comprises: oxidizing a feedstock in a reactor, the feedstock being part of a reaction mixture that also includes nitric acid; maintaining the concentration of dissolved and undissolved oxygen gas in the gaseous portion of the reaction mixture within approximately 25% of the concentration of oxygen gas in a headspace of the reactor; and maintaining a pressure in the reactor of at least approximately 2070 kPa.

According to another embodiment, a method comprises: oxidizing a feedstock in a reactor, the feedstock being part of a reaction mixture that also includes nitric acid, a secondary oxidizing acid, and oxygen gas; supplying the oxygen gas to the reaction mixture in an amount that is sufficient to regenerate at least a majority of the nitric acid; maintaining the concentration of dissolved and undissolved oxygen gas in the gaseous portion of the reaction mixture within approximately 25% of the concentration of oxygen gas in a headspace of the reactor; maintaining the reaction mixture at a temperature that is no more than approximately 210° C.; and maintaining a pressure in the reactor of at least approximately 2070 kPa.

According to another embodiment, a method comprises: oxidizing a feedstock in a reactor, the feedstock being part of a reaction mixture that also includes nitric acid and a secondary oxidizing acid; supplying gas to the reactor; and removing a reactor effluent from the reactor; wherein at least approximately 94 wt. % of the reaction mixture that exits the reactor does so in the reactor effluent; and wherein at least approximately 94 wt. % of gas that exits the reactor does so in the reactor effluent. The method may comprise dispersing gas from a headspace of the reactor into the reaction mixture. The method wherein at least approximately 98 wt. % of the reaction mixture that exits the reactor does so in the reactor effluent; and wherein at least approximately 98 wt. % of gas that exits the reactor does so in the reactor effluent. The method may comprise separating the gas from the reactor effluent. The method may comprise combining the feedstock with at least a portion of the reactor effluent. A headspace of the reactor may include 5 to 45 volume percent oxygen gas.

According to another embodiment, a method comprises: oxidizing a feedstock in a reactor, the feedstock being part of a reaction mixture that also includes nitric acid and oxygen gas; supplying gas to the reactor, the supplied gas including the oxygen gas; removing a reactor effluent from the reactor; and maintaining the reaction mixture at a temperature that is no more than approximately 210° C.; wherein the oxygen gas is supplied to the reaction mixture in an amount that is sufficient to regenerate at least a majority of the nitric acid; wherein at least approximately 94 wt. % of the reaction mixture that exits the reactor does so in the reactor effluent; and wherein at least approximately 94 wt. % of gas that exits the reactor does so in the reactor effluent. The method may comprise dispersing the oxygen gas from a headspace of the reactor into the reaction mixture. A headspace of the reactor may include 5 to 45 volume percent oxygen gas. The method may comprise combining the feedstock with at least a portion of the reactor effluent.

According to another embodiment, a method comprises: oxidizing a feedstock in a reactor, the feedstock being part of a reaction mixture that also includes nitric acid and a secondary oxidizing acid; supplying oxygen gas to the reactor; removing a reactor effluent from the reactor; measuring the amount of oxygen gas in the reactor effluent; and adjusting the supply of oxygen gas to the reactor based on the amount of oxygen gas measured in the reactor effluent. The method may comprise dispersing the oxygen gas from a headspace of the reactor into the reaction mixture. The method may comprise maintaining a pressure in the reactor of at least approximately 2070 kPa. The method may comprise supplying inert gas to the reactor to maintain the pressure of at least approximately 2070 kPa. A headspace of the reactor may include 2 to 60 volume percent oxygen gas. A headspace of the reactor may include 5 to 45 volume percent oxygen gas.

According to another embodiment, a method comprises: oxidizing a feedstock in a reactor, the feedstock being part of a reaction mixture that also includes nitric acid, a secondary oxidizing acid, and oxygen gas; supplying gas to the reactor, the supplied gas including the oxygen gas; removing a reactor effluent from the reactor; maintaining the reaction mixture at a temperature that is no more than approximately 210° C.; and maintaining a pressure in the reactor of at least approximately 2070 kPa; wherein the oxygen gas is supplied to the reaction mixture in an amount that is sufficient to regenerate at least a majority of the nitric acid; wherein at least approximately 94 wt. % of the reaction mixture that exits the reactor does so in the reactor effluent; and wherein at least approximately 94 wt. % of gas that exits the reactor does so in the reactor effluent. The method may comprise dispersing the oxygen gas from a headspace of the reactor into the reaction mixture. The method may comprise cooling the reactor effluent; and separating the gas from the reactor effluent. The reactor effluent may be vigorously mixed at low pressure to separate the gas. A headspace of the reactor may include 5 to 45 volume percent oxygen gas.

According to another embodiment, a method comprises: oxidizing a feedstock in a reactor, the feedstock being part of a reaction mixture that also includes nitric acid; supplying gas to the reactor; removing a reactor effluent from the reactor; and maintaining a pressure in the reactor of at least approximately 2070 kPa; wherein at least approximately 94 wt. % of the reaction mixture that exits the reactor does so in the reactor effluent; and wherein at least approximately 94 wt. % of gas that exits the reactor does so in the reactor effluent.

According to another embodiment, a method comprises: oxidizing a feedstock in a reactor, the feedstock being part of a reaction mixture that also includes nitric acid and oxygen gas; supplying the oxygen gas to the reactor in an amount that is sufficient to regenerate at least a majority of the nitric acid; removing a reactor effluent from the reactor; measuring the amount of oxygen gas in the reactor effluent; adjusting the supply of oxygen gas to the reactor based on the amount of oxygen gas measured in the reactor effluent; and maintaining the reaction mixture at a temperature that is no more than approximately 210° C.

According to another embodiment, a method comprises: oxidizing a feedstock in a reactor, the feedstock being part of a reaction mixture that also includes nitric acid; supplying oxygen gas to the reactor; removing a reactor effluent from the reactor; measuring the amount of oxygen gas in the reactor effluent; adjusting the supply of oxygen gas to the reactor based on the amount of oxygen gas measured in the reactor effluent; and maintaining a pressure in the reactor of at least approximately 2070 kPa.

According to another embodiment, a method comprises: oxidizing a feedstock in a reactor, the feedstock being part of a reaction mixture that also includes nitric acid, a secondary oxidizing acid, and oxygen gas; supplying oxygen gas to the reactor; removing a reactor effluent from the reactor; measuring the amount of oxygen gas in the reactor effluent; adjusting the supply of oxygen gas to the reactor based on the amount of oxygen gas measured in the reactor effluent; maintaining the reaction mixture at a temperature that is no more than approximately 210° C.; and maintaining a pressure in the reactor of at least approximately 2070 kPa; wherein the oxygen gas is supplied to the reaction mixture in an amount that is sufficient to regenerate at least a majority of the nitric acid.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A method comprising:
    comminuting an initial feedstock to form a primary feedstock that includes particles where the largest dimension of at least approximately 95% of the particles in the primary feedstock is no more than 7 mm; and
    oxidizing the primary feedstock in a reactor, the primary feedstock being part of a reaction mixture that also includes nitric acid and a secondary oxidizing acid;
    wherein the reaction mixture, excluding solids, includes no more than 5 wt % of the secondary oxidizing acid.

2. The method of claim 1 comprising feeding the primary feedstock into the reactor at a feed rate that is approximately constant.

3. The method of claim 1 comprising combining an oxidizing acid with the initial feedstock and/or the primary feedstock before the primary feedstock enters the reactor.

4. The method of claim 1 comprising combining effluent from the reactor with the initial feedstock and/or the primary feedstock before the primary feedstock enters the reactor.

5. The method of claim 1 wherein the initial feedstock includes effluent from the reactor.

6. The method of claim 1 wherein the largest dimension of at least approximately 95% of the particles in the primary feedstock is no more than 4 mm.

7. The method of claim 1 wherein the largest dimension of at least approximately 95% of the particles in the primary feedstock is no more than 2.5 mm.

8. The method of claim 1 wherein the largest dimension of at least approximately 95% of the particles in the primary feedstock is no more than 1.5 mm.

9. The method of claim 1 wherein the largest dimension of at least approximately 95% of the particles in the primary feedstock is no more than 0.5 mm.

10. A method comprising:
    oxidizing a feedstock in a reactor, the feedstock being part of a reaction mixture that also includes nitric acid and a secondary oxidizing acid;
    wherein the reaction mixture, excluding solids, includes no more than 5 wt % of the secondary oxidizing acid.

11. The method of claim 10 comprising combining nitric acid with the feedstock before the feedstock enters the reactor.

12. The method of claim 10 comprising combining effluent from the reactor with the feedstock before the feedstock enters the reactor.

13. The method of claim 10 wherein the feedstock includes effluent from the reactor.

14. The method of claim 10 comprising maintaining the reaction mixture at a temperature that is no more than approximately 210° C.

15. The method of claim 10 wherein the feedstock is a primary feedstock, the method comprising comminuting an initial feedstock to form the primary feedstock, wherein the largest dimension of at least approximately 95% of the particles in the primary feedstock is no more than 7 mm.

16. A method comprising:
oxidizing a feedstock in a reactor, the feedstock being part of a reaction mixture that also includes nitric acid and a secondary oxidizing acid;
wherein the reaction mixture, excluding solids, includes no more than approximately 3 wt % of the secondary oxidizing acid.

17. The method of claim 16 comprising combining nitric acid and the secondary oxidizing acid with the feedstock before the feedstock enters the reactor.

18. The method of claim 16 comprising combining effluent from the reactor with the feedstock before the feedstock enters the reactor.

19. The method of claim 16 wherein the feedstock includes effluent from the reactor.

20. The method of claim 16 comprising maintaining a pressure in the reactor of at least approximately 2070 kPa.

21. The method of claim 20 wherein the pressure in the reactor is at least 2800 kPa.

22. A method comprising:
oxidizing a feedstock in the reactor, the feedstock being part of a reaction mixture that also includes nitric acid, a secondary oxidizing acid, and oxygen gas;
dispersing oxygen gas from a headspace of the reactor into the reaction mixture;
maintaining the reaction mixture at a temperature that is no more than approximately 210° C.; and
maintaining a pressure in the reactor of at least approximately 2070 kPa;
wherein the reaction mixture, excluding solids, includes no more than 5 wt % of the secondary oxidizing acid.

23. The method of claim 22 wherein the feedstock is a primary feedstock, the method comprising comminuting an initial feedstock to form the primary feedstock, wherein the largest dimension of at least approximately 95% of the particles in the primary feedstock is no more than 7 mm.

24. The method of claim 22 wherein the feedstock includes effluent from the reactor.

25. The method of claim 22 comprising combining nitric acid and the secondary oxidizing acid with the feedstock before the feedstock enters the reactor.

26. The method of claim 22 wherein the feedstock is a primary feedstock, the method comprising:
combining effluent from the reactor with an initial feedstock to form an intermediate feedstock;
comminuting the intermediate feedstock to form a comminuted feedstock; and
combining the comminuted feedstock, nitric acid, and the secondary oxidizing acid to form the primary feedstock.

27. The method of claim 1 wherein the secondary oxidizing acid includes sulfuric acid.

28. The method of claim 1 wherein the reaction mixture, excluding solids, includes no more than approximately 3 wt % of the secondary oxidizing acid.

29. The method of claim 28 wherein the secondary oxidizing acid includes sulfuric acid.

30. The method of claim 1 wherein the reaction mixture, excluding solids, includes no more than approximately 15 wt % nitric acid.

31. The method of claim 10 comprising maintaining a pressure in the reactor of at least approximately 2070 kPa.

32. The method of claim 10 comprising dispersing oxygen gas from a headspace of the reactor into the reaction mixture.

33. The method of claim 32 wherein the headspace includes 2 to 60 volume percent oxygen gas.

34. The method of claim 10 wherein the secondary oxidizing acid includes sulfuric acid.

35. The method of claim 10 wherein the reaction mixture, excluding solids, includes no more than approximately 15 wt % nitric acid.

36. The method of claim 16 wherein the feedstock is a primary feedstock, the method comprising comminuting an initial feedstock to form the primary feedstock, wherein the largest dimension of at least approximately 95% of the particles in the primary feedstock is no more than 7 mm.

37. The method of claim 16 wherein the secondary oxidizing acid includes sulfuric acid.

38. The method of claim 16 comprising dispersing oxygen gas from a headspace of the reactor into the reaction mixture.

39. The method of claim 38 wherein the headspace includes 2 to 60 volume percent oxygen gas.

40. The method of claim 16 wherein the reaction mixture, excluding solids, includes no more than approximately 15 wt % nitric acid.

41. The method of claim 16 comprising maintaining the reaction mixture at a temperature that is no more than approximately 210° C.

42. The method of claim 22 wherein the secondary oxidizing acid includes sulfuric acid.

43. The method of claim 22 wherein the reaction mixture, excluding solids, includes no more than approximately 3 wt % of the secondary oxidizing acid.

44. The method of claim 43 wherein the secondary oxidizing acid includes sulfuric acid.

45. The method of claim 22 wherein the reaction mixture, excluding solids, includes no more than approximately 15 wt % nitric acid.

* * * * *